United States Patent
Fish et al.

(10) Patent No.: US 10,169,617 B2
(45) Date of Patent: Jan. 1, 2019

(54) MULTI-TOPOLOGY LOGIC GATES

(71) Applicant: Bar-Ilan University, Ramat-Gan (IL)

(72) Inventors: Alexander Fish, Tel-Mond (IL); Moshe Avital, Jerusalem (IL); Hadar Dagan, Kfar-Saba (IL); Osnat Keren, Rosh HaAyin (IL)

(73) Assignee: Bar-Ilan University, Ramat-Gan (IL)

( * ) Notice: Subject to any disclaimer, the term of this patent is extended or adjusted under 35 U.S.C. 154(b) by 166 days.

(21) Appl. No.: 15/301,409

(22) PCT Filed: Apr. 29, 2015

(86) PCT No.: PCT/IL2015/050446
§ 371 (c)(1),
(2) Date: Oct. 3, 2016

(87) PCT Pub. No.: WO2015/166496
PCT Pub. Date: Nov. 5, 2015

(65) Prior Publication Data
US 2017/0169220 A1   Jun. 15, 2017

Related U.S. Application Data

(60) Provisional application No. 61/985,487, filed on Apr. 29, 2014.

(51) Int. Cl.
*G06F 11/00* (2006.01)
*G06F 21/75* (2013.01)
*H03K 19/177* (2006.01)
*G06F 21/76* (2013.01)

(52) U.S. Cl.
CPC ............ *G06F 21/755* (2017.08); *G06F 21/76* (2013.01); *H03K 19/17768* (2013.01); *G06F 2221/034* (2013.01)

(58) Field of Classification Search
CPC .. G06F 21/755; G06F 21/76; G06F 2221/034; H03K 19/17768
USPC .......................................................... 726/23
See application file for complete search history.

(56) References Cited

U.S. PATENT DOCUMENTS

| 2006/0259887 A1 | 11/2006 | Tretz |
| 2007/0195949 A1 | 8/2007 | Okochi et al. |
| 2013/0063179 A1 | 3/2013 | Myers et al. |

FOREIGN PATENT DOCUMENTS

| WO | WO 01/45318 | 6/2001 |
| WO | WO 2015/166496 | 11/2015 |

OTHER PUBLICATIONS

International Preliminary Report on Patentability dated Nov. 10, 2016 From the International Bureau of WIPO Re. Application No. PCT/IL2015/050446. (5 Pages)

(Continued)

*Primary Examiner* — Mohammad W Reza

(57) ABSTRACT

An RMTL gate includes at least two logic blocks, where at least one of the logic blocks operates in multiple modes. The respective logic block mode(s) are selected by a topology selector which applies mode control signals to the logic blocks in order to obtain a selected topology for logic circuit operation. RMTL logic gates may be cascaded and/or interconnected to form an RMTL logic circuit with multiple logic gates which may operate with dynamically varying topologies. Use of random, semi-random or specified control sequences may protect the logic circuit against security attacks.

15 Claims, 22 Drawing Sheets

(56) References Cited

OTHER PUBLICATIONS

International Search Report and the Written Opinion dated Aug. 10, 2015 From the International Searching Authority Re. Application No. PCT/IL2015/050446.

Kamel et al. "Analysis of Dynamic Differential Swing Limited Logic for Low-Power Secure Applications", Journal of Low Power Electronics and Applications, 2(1): 98-126, Mar. 16, 2012.

Tiri et al. "A Dynamic and Differential CMOS Logic With Signal Independent Power Consumption to Withstand Differential Power Analysis on Smart Cards", Proceedings of the 28th European Solid-State Circuits Conference, ESSCIRC 2002, Florence, Italy, Sep. 24-26, 2002, p. 403-406, Sep. 2002.

Tiri et al. "A Logic Level Design Methodology fro A Secure DPA Resistant ASIC or FPGA Implementation", Proceedings of the Design, Automation and Test in Europe Conference and Exhibition, DATE '04, Feb. 16-20, 2004, 1: 246-251, Feb. 2004.

MULTI-TOPOLOGY LOGIC GATES

RELATED APPLICATIONS

This application is a National Phase of PCT Patent Application No. PCT/IL2015/050446 having International filing date of Apr. 29, 2015, which claims the benefit of priority under 35 USC § 119(e) of U.S. Provisional Patent Application No. 61/985,487 filed on Apr. 29, 2014. The contents of the above applications are all incorporated by reference as if fully set forth herein in their entirety.

FIELD AND BACKGROUND OF THE INVENTION

The present invention, in some embodiments thereof, relates to a multi-topology logic gate and, more particularly, but not exclusively, to operation of multi-topology logic circuits.

The use of cryptographic devices storing sensitive information securely has substantially increased in the last decades, and in the foreseen future this trend is probably about to continue. Devices such as smart cards, mobile devices, radio frequency identification (RFID), and wireless sensor networks (WSN), are implemented in various applications [2-4]. In order to handle a very wide variety of threats, these devices, in most cases, include a multi-level security protection. Usually, the security system comprises an authentication block, and depending on the application, also a cryptographic block. Essentially, the purpose of the cryptographic block is to encrypt the plaintext to be sent, according to some cryptographic algorithm and secret key, and vice versa.

The security sensitive applications face different kinds of threats today. The mathematical/software attacks try to reveal the device key by using the plaintext, the ciphertext, or both [5]. In contrast, side-channel attacks, brought into attention slightly more than a decade ago [1,6,7], exploit and misuse the information related to the physical behavior of these devices, such as: operation time, power consumption, or emitted electromagnetic radiations.

Such attacks may be performed in a form of simple power analysis (SPA), which includes just few measurements but requires much knowledge regarding the ASIC implementation, or more dangerous but time consuming differential power analysis (DPA) which includes a large number of measurements, assuming less regarding the ASIC implementation [8].

The aforementioned attacks have lead researchers and commercial companies to develop many countermeasures against them, of which the common principle is breaking the connection between the instantaneous power consumption and the intermediate processed data in the ASIC crypto-core. This includes algorithmic or system approaches that are based on correlation reduction between the performed operation and circuit activity, such as: an addition of dummy operations, averaging the activities of the different processing steps [9], a randomization of crypto-operation execution [10]. Another algorithmic approach called blinding uses an internal random generation and masking the processed data with the random numbers using mathematical operation like exclusive-or operation [11]. The disadvantages of these methods are higher power consumption and area. Additionally, these methods are still vulnerable to higher-order DPA attacks [12].

Similar to algorithmic methodologies, the hardware redesign methods could be utilized, where the goal is averaging the power consumption per clock cycle. This can be achieved by addition of "dummy" gates, which draw always the same amount of current regardless of its inputs [12]. The disadvantage of these techniques is a big energy consumption overhead that is introduced. Another method is based on use of dynamic differential logic. Dynamic differential logic has the constant current consumption independent from the switching type (0 to 1 or 1 to 0). There are different variants of this approach including Sense Amplifier Based Logic (SABL) [13], and Wave Dynamic Differential Logic (WDDL) [14].

Although many logic families, such as CMOS, PTL, Domino, GDI, DML and others [15-18] have been proposed in the literature, only a few of them were identified as candidates to improve the resistance to power attacks.

Useful and important metrics for analyzing and evaluating the effectiveness of a DPA attack are the inter-signal SNR ($SNR_{INTER}$), described in [19], and the use of information theoretic tools (e.g., mutual information), described in [12]-[25]. The $SNR_{INTER}$ indicates the difficulty of the recognition of the correct key from the wrong keys. Referring to the information theoretic tools, the amount of information that leaks from the circuit when it processes data is evaluated. The mutual information between the inputs to the circuit and the power consumed is examined. These information theoretic tools help us to divide the security problem into two orthogonal problems: evaluation of the actual information that leaks from the circuit, and supposition of how an attacker can (or cannot) model and use it to find the correct key.

REFERENCES

[1] P. Kocher, J. Jaffe and B. Jun, "Differential power analysis," in Advances in Cryptology-CRYPTO'99, pp. 388-397, 1999.
[2] Y. Zhang, L. T. Yang and J. Chen, "RFID and Sensor Networks: Architectures, Protocols, Security, and Integrations," Taylor & Francis, 2010.
[3] W. Rankl and W. Effing, "Smart Card Handbook," Wiley, 2004.
[4] K. Finkenzeller and D. Muller, "RFID Handbook: Fundamentals and Applications in Contactless Smart Cards, Radio Frequency Identification and Near-Field Communication," Wiley, 2010.
[5] D. R. Stinson, "Cryptography: Theory And Practice," Chapman & Hall/CRC, 2006.
[6] P. C Kocher, "Timing attacks on implementations of Diffie-Hellman, RSA, DSS, and other systems," in Advances in Cryptology-CRYPTO'96, pp. 104-113, 1996.
[7] S. Mangard, N. Pramstaller and E. Oswald, "Successfully attacking masked AES hardware implementations," in Cryptographic Hardware and Embedded Systems-CHES 2005, Springer, pp. 157-171, 2005.
[8] S. Mangard, E. Oswald and T. Popp, "Power analysis attacks: Revealing the secrets of smart cards," Springer Science Business Media, 2007.
[9] K. Wu, H. Li, T. Chen and F. Yu, "Electromagnetic analysis on elliptic curve cryptosystems: Measures and counter-measures for smart cards," in Intelligent Information Technology Application, IITA 2009, Third International Symposium on, pp. 40-43, 2009.
[10] B. Gammel, H. Bock and M. Goessel, "Cryptographic Unit and Method for Operating a Cryptographic Unit," vol. 11/318,061, Aug. 16, 2007.

[11] J. Coron, "Resistance against differential power analysis for elliptic curve cryptosystems," in Cryptographic Hardware and Embedded Systems, pp. 292-302, 1999.

[12] M. Joye, P. Paillier and B. Schoenmakers, "On second-order differential power analysis," in Cryptographic Hardware and Embedded Systems—CHES 2005, Springer, pp. 293-308, 2005.

[13] K. Tiri, M. Akmal and I. Verbauwhede, "A dynamic and differential CMOS logic with signal independent power consumption to withstand differential power analysis on smart cards," in Solid-State Circuits Conference, ESSCIRC 2002, Proceedings of the 28th European, pp. 403-406, 2002.

[14] K. Tiri and I. Verbauwhede, "A logic level design methodology for a secure DPA resistant ASIC or FPGA implementation," in Proceedings of the conference on Design, automation and test in Europe-Volume 1, pp. 10246, 2004.

[15] A. Kaizerman, S. Fisher and A. Fish, "Subthreshold Dual Mode Logic," IEEE Trans. Very Large Scale Integr. (VLSI) Syst., vol. 21, no. 5, pp. 979-983, May 2013.

[16] I. Levi, O. Bass, A. Kaizerman, A. Belenky and A. Fish, "High speed Dual Mode Logic Carry Look Ahead Adder," IEEE International Symposium on Circuits and Systems (ISCAS), 2012, pp. 3037-3040, 20-23 May 2012.

[17] A. Morgenshtein, A. Fish and I. A. Wagner, "Gate-diffusion input (GDI): a power-efficient method for digital combinatorial circuits," IEEE Trans. Very Large Scale Integr. (VLSI) Syst., vol. 10, no. 5, pp. 566,581, October 2002.

[18] J. M. Rabaey, A. P. Chandrakasan and B. Nikolic, "Digital integrated circuits," Prentice hall Englewood Cliffs, 2002.

[19] M. Alioto, M. Poli, and S. Rocchi, "A general model for differential power analysis attacks to static logic circuits," International Symposium on Circuits and Systems (ISCAS2008), IEEE, Washington, USA, pp. 3286-3289, May 2008.

[20] T. S. Messerges, E. A. Dabbish, and R. H. Sloan, "Examining smart-card security under the threat of power analysis attacks," IEEE Trans. Computers, vol. 51, no. 5, pp. 541-552, May 2002.

[21] M. Renauld, D Kamel, F.-X. Standaert, and D. Flandre, "Information theoretic and security analysis of a 65-nanometer DDSLL AES S-box," in CHES (Lecture Notes in Computer Science), vol. 6917, B. Preneel and T. Takagi, Eds. New York, N.Y., USA: Springer-Verlag, 2011, pp. 223-239.

[22] M. Renauld, F.-X. Standaert, N. Veyrat-Charvillon, D Kamel, and D. Flandre, "A formal study of power variability issues and side-channel attacks for nanoscale devices," in *Advances in Cryptology-EUROCRYPT*. Berlin, Germany: Springer-Verlag, 2011, pp. 109-128.

[23] S. Mangard, E. Oswald, and F.-X. Standaert, "One for all—All for one: Unifying standard differential power analysis attacks," *IET Inf. Security*, vol. 5, no. 2, pp. 100-110, June 2011.

[24] F.-X. Standaert, T. Malkin, and M. Yung, "A unified framework for the analysis of side-channel key recovery attacks," in *Advances in Cryptology-EUROCRYPT*. Berlin, Germany: Springer-Verlag, 2009, pp. 443-461.

[25] F. Mac, F.-X. Standaert, and J.-J. Quisquater, "Information theoretic evaluation of side-channel resistant logic styles," in CHES (Lecture Notes in Computer Science), vol. 4727, P. Paillier and I. Verbauwhede, Eds. New York, N.Y., USA: Springer-Verlag, 2007, pp. 427-442.

[26] M. Avital, H. Dagan, O. Keren, and A. Fish, "Randomized Multitopology Logic Against Differential Power Analysis," IEEE Trans. Very Large Scale Integr. VLSI Syst., vol. PP, no. 99, pp. 1-1, 2014.

[27] F. P. Miller, A. F. Vandome, and J. McBrewster, *Advanced Encryption Standard*. Orlando, Fla., USA: Alpha Press, 2009.

[28] S. Chari, J. R. Rao, and P. Rohatgi, "Template attacks," in CHES. Berlin, Germany: Springer-Verlag, 2002, pp. 13-28.

[29] D Kamel, M. Renauld, D. Bol, F.-X. Standaert, and D. Flandre, "Analysis of dynamic differential swing limited logic for low-power secure applications," J. Low Power Electron. Appl., vol. 2, no. 1, pp. 98-126, 2012.

SUMMARY OF THE INVENTION

The security of digital systems is under the threat of so-called side channel attacks. In particular, Differential Power Analysis (DPA) and Differential Electromagnetic Analysis (DEMA) are powerful attack techniques, as they do not require any assumptions regarding the chip implementation of the device.

A Randomized Multi-Topology Logic (RMTL) family is presented herein. This logic family enables the design of logic circuits and gates which may be operated in multiple topologies. A randomization methodology utilized RMTL logic circuits in a countermeasure strategy to deal with side channel attacks. The high immunity of cryptographic modules to the side channel attacks is obtained by randomly switching between the various topologies of Randomized Multi Topology Logic (RMTL). Consequently, the resultant power profile of such devices becomes much more difficult to estimate, causing the side channel attacks to be less effective.

According to an aspect of some embodiments of the present invention there is provided a multi-topology logic gate for performing a specified logic function. The logic gate has logic inputs and a logic output, and includes:
 i) a logic output connection to output a logic output signal;
 ii) multiple logic input connections to input logic signals;
 iii) at least two logic blocks, each of the blocks respectively including logic inputs connectable to the logic gate input connections, and a logic output connected to the logic output connection. At least one of the logic blocks is able to operate in multiple modes, in accordance with a respective mode control signal; and
 iv) a topology selector which applies mode control signals to the logic blocks so as to operate the logic gate in multiple topologies.

According to some embodiments of the invention, the logic blocks include respective transistor networks.

According to some embodiments of the invention, each of the logic blocks implements the same logic function in different respective topologies.

According to some embodiments of the invention, logic blocks having multiple of modes of operation respectively operate in at least two of: static, dynamic and on-off modes, in accordance with the mode control signals.

According to some embodiments of the invention, at least two of the logic blocks operate in multiple modes in accordance with a respective mode control signal.

According to some embodiments of the invention, the multi-topology logic gate further includes a logic block with a single mode of operation.

According to some embodiments of the invention, at least one of the mode control signals is a constant voltage.

According to some embodiments of the invention, at least one of the mode control signals is a clock signal.

According to some embodiments of the invention, the topology selector connects a pre-charge clock signal to the logic output connection during pull-down dynamic logic operation.

According to some embodiments of the invention, the topology selector connects a pre-discharge clock signal to the logic output connection during pull-up dynamic logic operation.

According to some embodiments of the invention, the topology selector switches the logic gate between the topologies randomly.

According to some embodiments of the invention, the topology selector switches the logic gate between the topologies in accordance with a specified sequence.

According to some embodiments of the invention, the topology selector includes topology control inputs and switches the logic gate between the topologies in accordance with external signals input to the topology control inputs.

According to some embodiments of the invention, the topology selector directs logic input signals to respective logic inputs of selected ones of the logic blocks, in accordance with a current topology.

According to some embodiments of the invention, the logic inputs of at least one of the logic blocks are fixedly connected to the logic input connections.

According to an aspect of some embodiments of the present invention there is provided a multi-topology logic circuit, which includes:

i) multiple logic gates, wherein at least one of the logic gates is a multi-topology logic gate which is capable of operating in multiple logic topologies in accordance with a respective topology control signal; and ii) a topology selector which provides the topology control signals to the multi-topology logic gates so as to operate the logic circuit in multiple topologies.

According to some embodiments of the invention, each of the multi-topology logic gates respectively includes at least two logic blocks, and at least one of the logic blocks is capable of operating in multiple modes. The topology control signals select respective modes of operation of the logic blocks.

According to some embodiments of the invention, the logic circuit further includes an interconnection element for separating between the logic gates.

According to some embodiments of the invention, the logic circuit operates in at least two static topologies.

According to some embodiments of the invention, the logic circuit operates in at least two dynamic topologies.

According to some embodiments of the invention, the logic circuit operates in at least three topologies.

According to an aspect of some embodiments of the present invention there is provided a method for multi-topology logic circuit operation for performing a logic function. The logic circuit includes multiple interconnected logic gates, wherein at least one of the gates is capable of operating in multiple topologies in accordance with respective topology control signals. The method includes inputting a topology control sequence during logic circuit operation so as to dynamically change logic gate topologies during operation.

According to some embodiments of the invention, each of the multi-topology logic gates respectively includes at least two logic blocks at least one of which operates in multiple modes, and the method further includes: dynamically switching the logic blocks between the modes during logic gate operation, thereby to obtain a selected topology for logic circuit operation.

According to some embodiments of the invention, the control sequence is a random sequence.

According to some embodiments of the invention, the control sequence is a semi-random sequence.

According to some embodiments of the invention, the method further includes generating a respective control sub-sequence for each of the logic gates, the respective control sub-sequences collectively forming the control sequence.

According to some embodiments of the invention, the logic circuit uses a security key and the control sequence disguises the security key from detection during logic circuit operation.

According to some embodiments of the invention, the control sequence maintains a single logic function for the logic circuit, while varying the respective topologies of the logic gates.

According to some embodiments of the invention, the control sequence switches between multiple logic functions for the logic circuit, while varying the respective topologies of the logic gates.

According to an aspect of some embodiments of the present invention there is provided a method for multi-topology logic gate operation. The method includes: providing a logic gate capable of operating in multiple topologies, wherein the current topology of the logic gate is selected by a topology control signal, and inputting a sequence of topology control signals during logic gate operation so as to dynamically switch the logic gate between the topologies.

According to some embodiments of the invention, the multi-topology logic gate includes at least two logic blocks associated with a logic gate output connection. Each of the logic blocks has respective logic inputs which are connectable to logic gate input connections. At least one of the logic blocks operates in multiple modes, and the control sequence dynamically switches the logic blocks between the modes during logic gate operation to obtain a selected topology for logic gate operation.

According to some embodiments of the invention, logic blocks having a multiple modes of operation operate respectively in at least two of static, dynamic and on-off modes, in accordance with the mode control signals.

According to some embodiments of the invention, the logic gate is switched between topologies so as to dynamically vary a power profile of the gate during operation.

According to some embodiments of the invention, the control sequence maintains a single logic function for the logic gate.

According to some embodiments of the invention, the control sequence switches the logic gate between multiple logic functions.

According to an aspect of some embodiments of the present invention there is provided a multi-topology logic gate for performing a specified logic function, the logic gate comprising logic inputs and a logic output, comprising:

at least two logic blocks, each of the blocks comprising a respective transistor network; and at least one connection element, wherein each of the connection elements has a respective control input, first connection input and second connection input and is configured to connect and disconnect the first and second connection inputs in accordance with a control signal into the respective control input;

wherein the logic blocks and the at least one connection element are interconnected such that the logic gate operates in differing logic topologies in accordance with the control signals, thereby to provide the specified logic function.

According to some embodiments of the invention, the logic gate is configured for operation in at least two static topologies.

According to some embodiments of the invention, the logic gate is configured for operation in at least two dynamic topologies.

According to some embodiments of the invention, the logic gate is configured for operation in at least three topologies.

According to some embodiments of the invention, at least one of the connection elements is connected to a clock signal.

According to some embodiments of the invention, the clock signal is connected to a control input of a respective connection element.

According to some embodiments of the invention, at least one of the connection elements is connected to ground.

According to some embodiments of the invention, wherein the ground connection is to a connection input of a respective connection element.

According to some embodiments of the invention, at least one of the connection elements is connected to a constant voltage.

According to some embodiments of the invention, the constant voltage connection is to a connection input of a respective connection element.

According to an aspect of some embodiments of the present invention there is provided a multi-topology logic circuit, comprising a plurality of multi-topology logic gates, the logic gates comprising respective logic inputs and at least one respective connection input, the logic circuit being configured to perform a same logic operation for differing specified input sequences to the control inputs.

According to some embodiments of the invention, the multi-topology logic further comprises an interconnection element for separating between the logic gates.

According to an aspect of some embodiments of the present invention there is provided a method for logic circuit operation, the logic circuit comprising a plurality of logic inputs, a logic output, and at least one control input, comprising:

connecting a plurality of multi-topology logic gates to form a logic circuit, wherein the logic circuit performs a logic function, wherein each of the multi-topology logic gates is configured for operating in respective multiple topologies in accordance with the at least one control input; and inputting a specified control sequence to the control inputs during logic circuit operation so as to dynamically switch between respective topologies of the logic gates during the operation.

According to some embodiments of the invention, the control sequence comprises a random sequence.

According to some embodiments of the invention, the control sequence comprises a semi-random sequence.

According to some embodiments of the invention, the method further comprises generating a respective control sub-sequence for each of the logic gates, the respective control sub-sequences collectively forming the specified control sequence.

According to some embodiments of the invention, the logic circuit comprises a security key and the control sequence is adapted to disguise the security key from detection during logic circuit operation.

According to some embodiments of the invention, the control sequence maintains a single logic function for the logic circuit, while varying the respective topologies of the logic gates.

According to some embodiments of the invention, the control sequence switches between multiple logic functions for the logic circuit, while varying the respective topologies of the logic gates.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
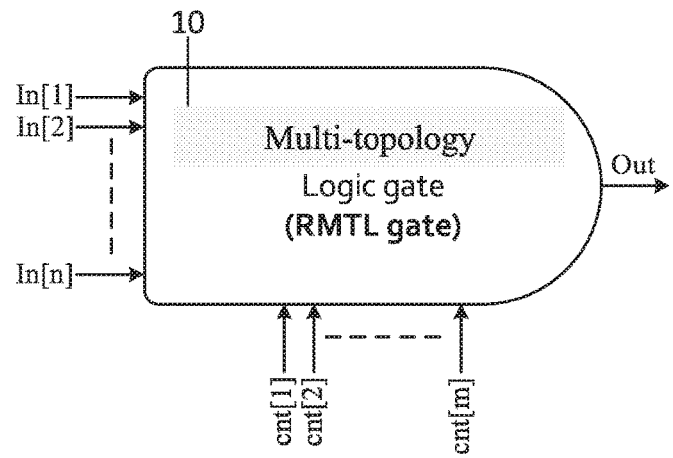
FIG. 1A is a simplified illustration of a logic gate with multiple topologies (RMTL), according to some embodiments of the invention.

The present invention, in some embodiments thereof, relates to a multi-topology logic gate and, more particularly, but not exclusively, to operation of multi-topology logic circuits.

The following presents embodiments of a Multi-Topology Logic family (RMTL). RMTL logic gates and circuits include control inputs which dynamically switch the RMTL gate/circuit operating topology during operation.

As used herein, the term "topology" means a configuration of transistor connectivity within a logic gate or circuit. As described below, an RMTL gate (or circuit) may provide the same logical function while operating with different topologies.

As used herein, the terms "randomized multi-topology logic gate" and RMTL mean that the multi-topology logic gate may be controlled in a randomized manner. The terms are not limiting to a logic gate which contains randomly-operating elements within it.

RMTL logic circuits and gates may be dynamically switched between different operating topologies during circuit operation. By inputting the appropriate control sequences the connection between the consumed power and the processed data may be broken. Random switching between the logic topologies during regular operation may result in random power profiles of the cryptographic device/module, and consequently higher immunity to side channel attacks.

RMTL logic gates and circuits are not to a particular hardware realization of any circuit architecture. The RMTL circuits may be useful for implementation of any cryptographic architecture, including, but not limited to, symmetric design, asymmetric design and automatic design (for example implemented by CAD tools, etc.).

The RMTL concept is technology (i.e., process node) independent, and is not limited to a particular semi-conductor material or manufacturing technology, including silicon (e.g., 65 nm, 40 nm, 28 nm etc. . . . ) and non-silicon processes.

Simulation results made for an exemplary five-topology RMTL family are presented below. These results show higher immunity to DPA attacks as compared to the CMOS logic family. These results may also indicate higher immunity to DEMA attacks, as randomized power profile of this gate results in randomized electromagnetic radiation as well.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

RMTL Gates

Referring now to the drawings, FIG. 1A is a simplified illustration of an RMTL gate, according to embodiments of the present invention. Real time switching between the RMTL gate topologies may be performed. RMTL gate 10 includes n data inputs (In) and m control signals cnt which determine the gate's relevant topology.

Figure 4:
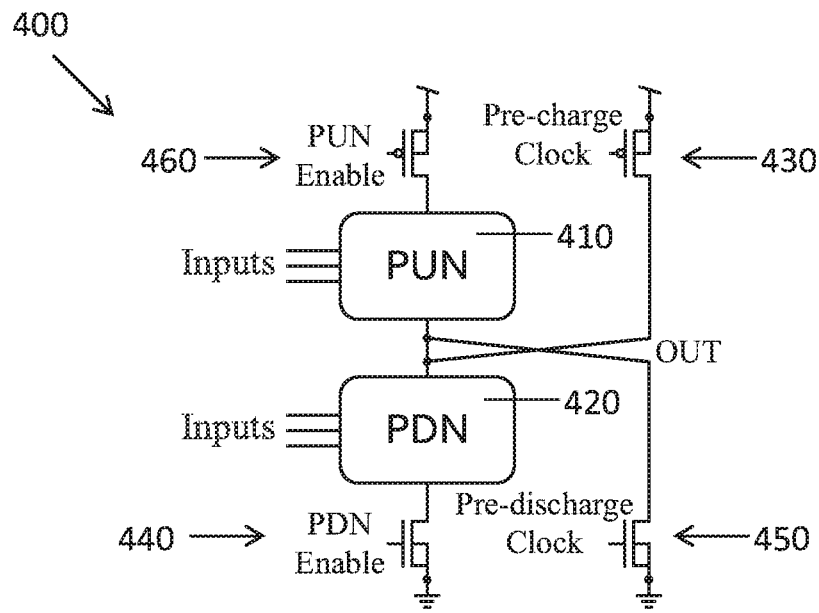
FIG. 4 is a simplified block diagram of an exemplary RMTL gate with five-topology capability, according to some embodiments of the invention.
Figure 5A:
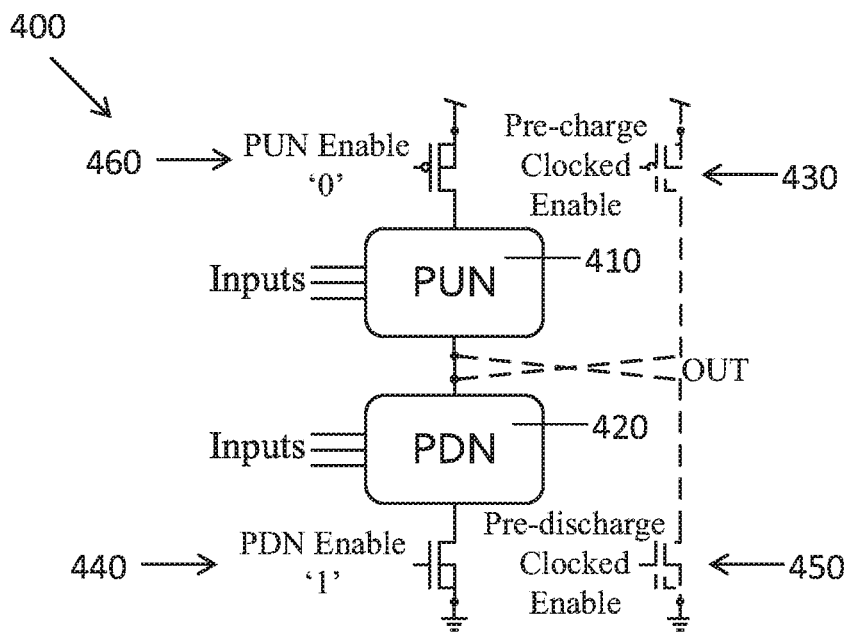
FIGS. 5A-5E illustrate five RMTL gate topologies, according to embodiments of the invention.
Figure 5B:
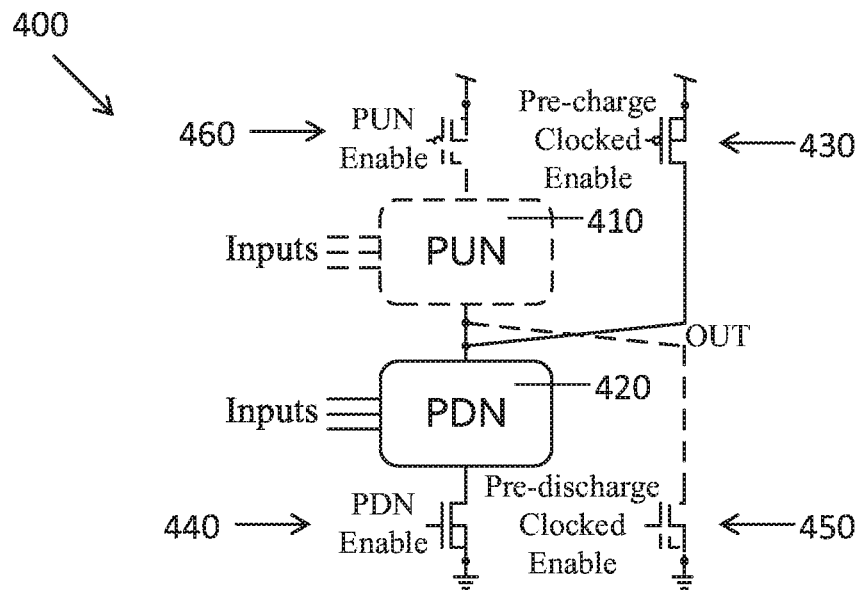
Figure 5C:
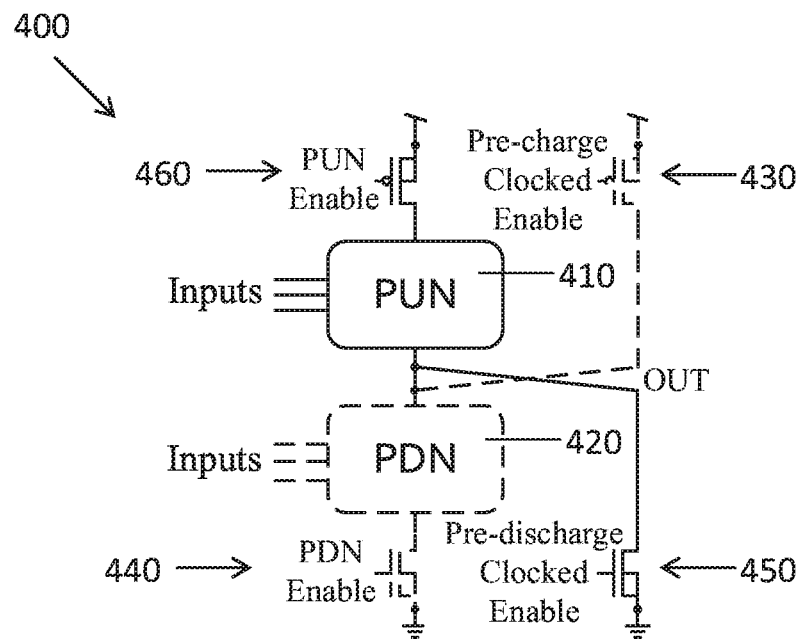
Figure 5D:
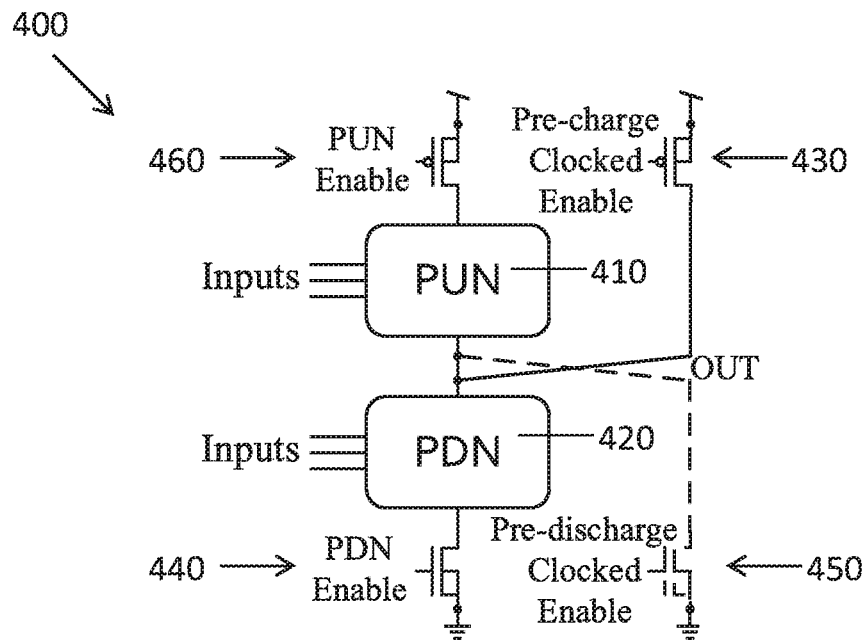
Figure 5E:
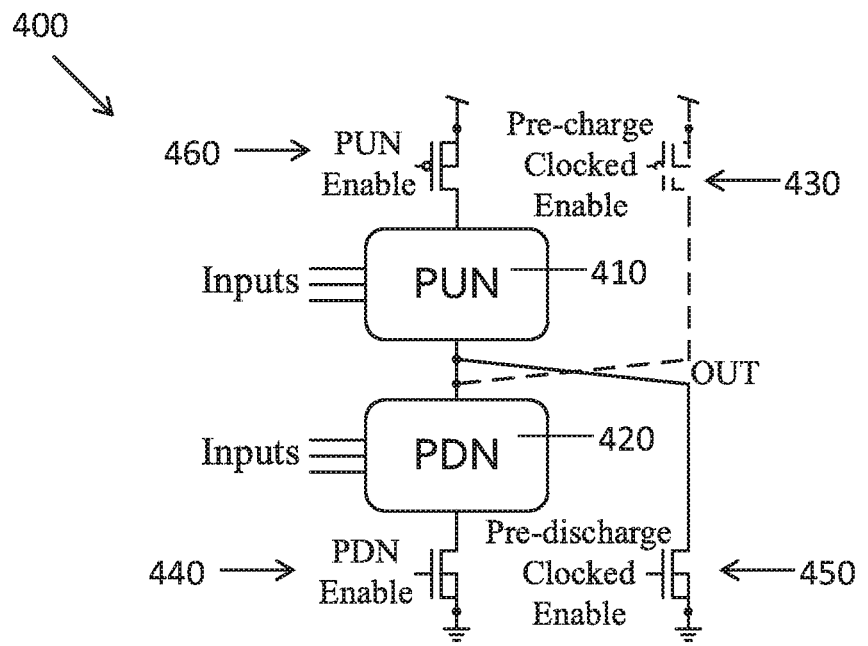

Although this concept may appear to be taking up a lot of space, the implementation of such logic family may include wise integration between the number of topologies and the area of an RMTL gate, as may be seen in the example below (FIGS. 4-5E).

The RMTL logic gate/circuit topology types may include both static and dynamic logic families, such as CMOS, PTL, Differential PTL, Dynamic Logic, Differential Dynamic Logic, Domino and/or others. The main characteristic of these topologies is their different consumed power with the same input data. Consequently, for the same data flow of the same operation, a different power profile may be obtained for each topology of the same RMTL gate. Moreover, for a cryptographic module in a device realized with RMTL gates, random switching between the topologies of its gates may be performed (using random cnt signals), and a random power profile may be obtained. This random switching may result in a higher immunity to side channel attacks on the attacked device, as shown below.

Figure 1B:
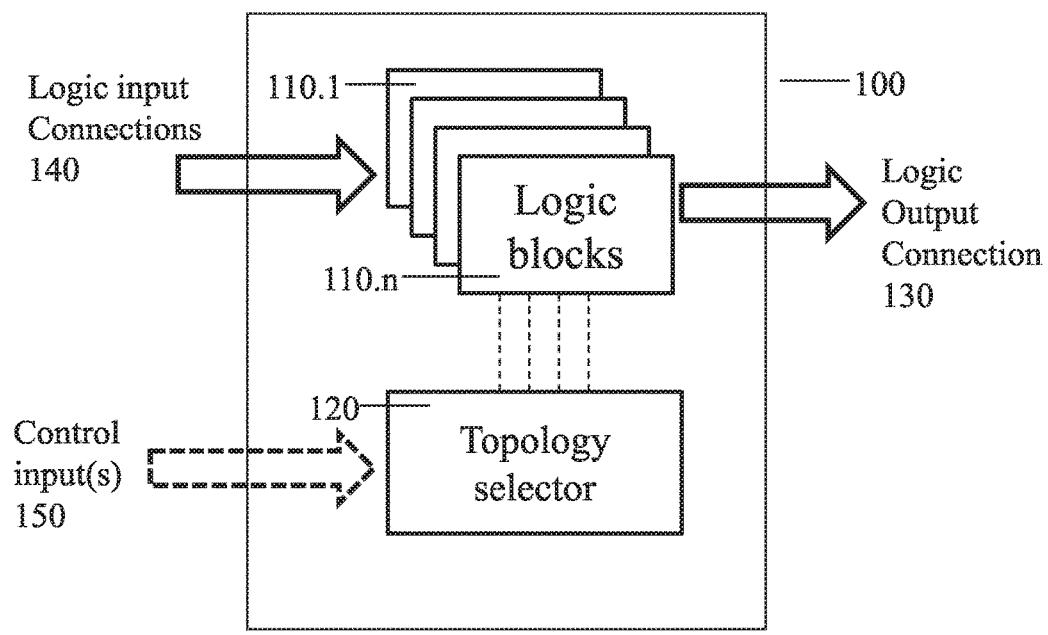
FIG. 1B is a simplified block diagram of an RMTL gate, according to some embodiments of the invention.

Reference is now made to FIG. 1B, which is a simplified block diagram of a multi-topology logic gate for performing a specified logic function, according to embodiments of the present invention. RMTL gate 100 includes:

i) Logic output connection 130 which outputs the for the logic gate;

ii) Logic input connections 140 which input the logic input signals to RMTL gate 100;

iii) At least two logic blocks 110.1 to 110.$n$; and iv) Topology selector 120 which controls logic blocks 110.1 to 110.$n$ in order to operate RMTL gate 100 in the required topology.

As used herein the term "connection" means a location where an input or output electronic signal enters or leaves the logic gate. The connection may be internal to the logic circuit containing the RMTL gate.

Each of logic blocks 110.1 to 110.$n$ includes logic inputs which may be connected to the logic input connections 140, and a logic output connected to logic output connection 130. At least one of the logic blocks operates in multiple modes, where the respective mode is selected by a respective mode control signal provided by topology selector 120. Further optionally, at least two of the logic blocks have multiple modes of operation.

Optionally, logic block modes include two or more of:

i) On/Off mode (also denoted herein "connected" and "disconnected")—When turned "off" (or disconnected) the logic block does not affect the operation of the logic gate. When "on" (or connected) the logic block participates in logic gate operation;

ii) Static mode, optionally implemented by operating one or more of the logic blocks continuously in on mode; and iii) Dynamic mode. Optionally, dynamic mode operation is implemented using a clocked mode control signal to switch one or more logic blocks between on and off modes, while inputting a pre-charge or pre-discharge signal to the logic gate output if or as needed.

Optionally, one or more of the logic blocks has a single mode of operation.

Exemplary embodiments for controlling the mode of each logic block in order to obtain the desired topology are described below for FIGS. 5A-5E.

Topology selector 120 inputs mode control signals to the logic blocks so as to implement the logic function in multiple topologies. Topology selector 120 ensures that all logic blocks and other circuit components operate in the selected topology without conflict. For example, when operating in static mode topology selector 120 does not apply pre-charge signals to the logic output whereas the pre-charge signal may be applied during dynamic mode.

Optionally, topology selector 120 selects the mode control signals (and optionally other input signals required for operating in a given topology) in accordance with a specified logic and/or using a look-up table which identifies, for each topology, the correct signals to be input to the RMTL gate.

Optionally, each of the logic blocks independently implements the same logic function with different logic block topologies. Further optionally, the circuit is switched between topologies by turning one of the logic blocks (i.e. "on" mode) on while the remaining logic blocks are in "off" mode.

Optionally, the logic blocks include transistor networks. Other electronic components (e.g. capacitors) may be included within or between the logic blocks to obtain the desired logic block and/or logic gate operation.

Mode control signals applied by topology selector 120 to the logic blocks (and optionally other locations in the logic gate) may include:

i) A constant voltage;

ii) A clock signal;

iii) Ground connection.

Optionally, topology selector 120 connects a pre-charge clock signal to logic input connection 130 during pull-down dynamic logic operation.

Optionally, topology selector 120 connects a pre-discharge clock signal to logic input connection 130 during pull-up dynamic logic operation.

In some embodiments, the logic input signals are not input to all the logic blocks for all gate topologies. Optionally, topology selector 120 directs logic input signals to the logic inputs of only some of the logic blocks as required by the current logic gate topology. Additionally or alternately, one or more of the logic blocks have fixed connections to logic input connections 140.

Optionally, topology selector 120 switches between logic gate topologies randomly, semi-randomly or in a specified sequence. Alternately or additionally, topology selector 120 switches between logic gate topologies in accordance with a sequence of topology control signals input to topology selector 120 by an external circuit element such as a processor.

Figure 1C:
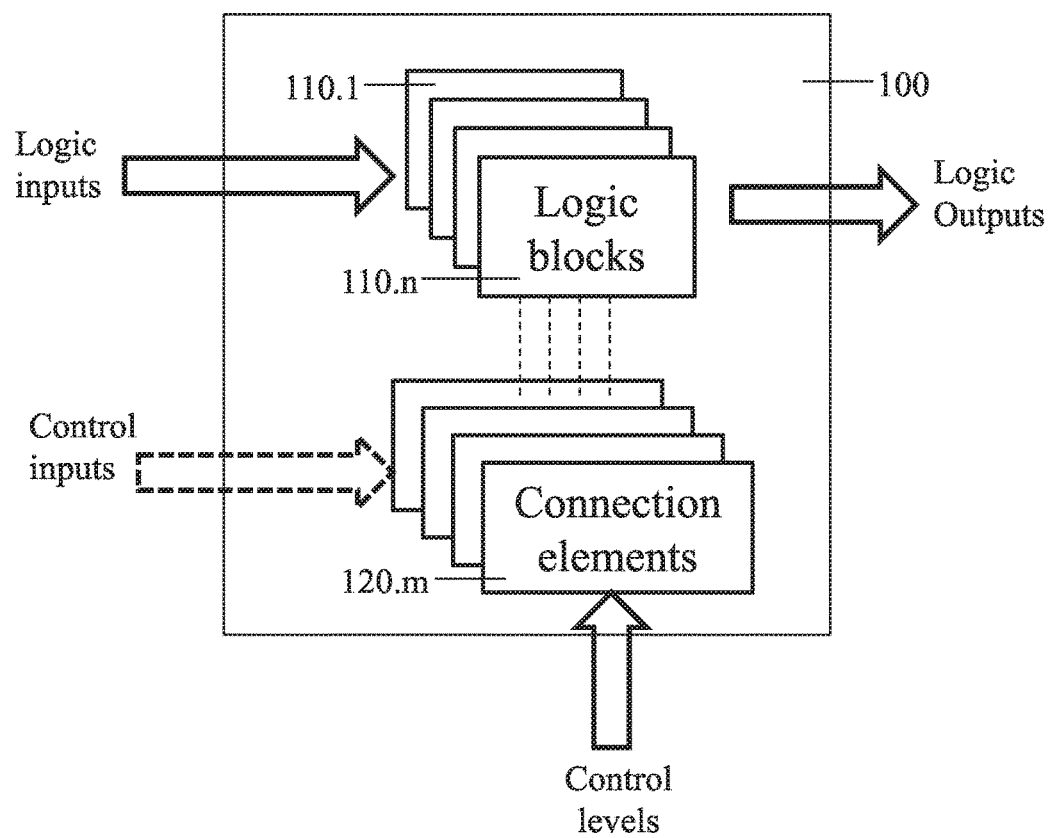
FIG. 1C is a simplified block diagram of an RMTL gate, according to some embodiments of the invention.

Reference is now made to FIG. 1C, which is a simplified block diagram of a multi-topology logic gate for performing a specified logic function, according to exemplary embodiments of the present invention. RMTL logic gate 100 has logic inputs and a logic output (or outputs).

RMTL logic gate 100 includes:

i) At least two logic blocks 110.1-110.$n$, each of the blocks comprising a respective transistor network; and ii) At least one connection element 120.1-120.$m$, where each connection element includes a control input and a connection input and a connection output connected to a logic block. Control signals applied to the control inputs open and close an electronic pathway between the two connection input and output.

The logic blocks and connection element(s) are interconnected such that the logic gate operates in differing logic topologies in accordance with the control signals, thereby to provide the specified logic function.

The logic gate may operate with varying types of topologies, including but not limited to:

i) At least two static topologies.

ii) At least two dynamic topologies.

iii) At least three topologies.

In order to create the desired topologies the connection element's inputs may be connected to various types of signals, including but not limited to:

i) A clock signal.
ii) A ground connection.
iii) A constant voltage.

Opening and closing the connection elements connects the input signals to the logic blocks, and optionally other locations in the logic gate, providing control over logic gate topology and operation.

Figure 1D:
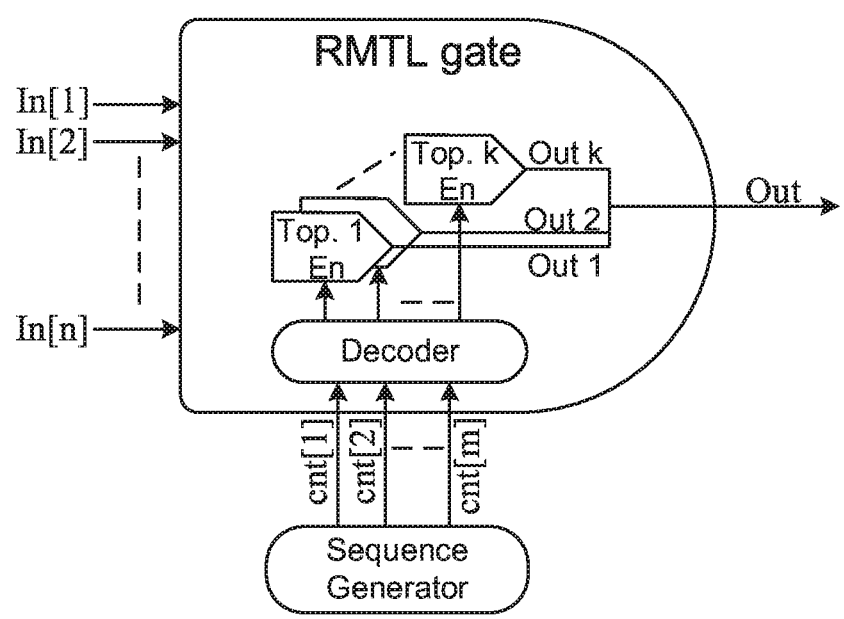
FIG. 1D is a simplified illustration of an RMTL gate, according to exemplary embodiments of the invention.

Reference is now made to FIG. 1D, which is an illustrative diagram of an RMTL gate, in accordance with embodiments of the present invention. FIG. 1D shows an RMTL gate implemented with k topologies. Each consumes different power for the same data flow through the inputs In[1]÷In[n]. A sequence generator such as random number generator, pseudo random generator or specific optimized sequence generator, determines (through control signals cnt[1]÷cnt[m]) the specific topology by enabling one topology at a time and disabling the rest. This may be realized by the operation of an optional decoder (which may not be implemented in the RMTL gate and is shown here to clarify the topology selection mechanism). In other words, the power profile of an RMTL gate randomly changes for the same data flow due to the sequence generator that controls the topology selection. The decoder is comparable to topology selector 120, in the case the sequence of logic gate topologies is determined by a sequence of control inputs into the topology selector.

RMTL Logic Gate Operation

Figure 2:
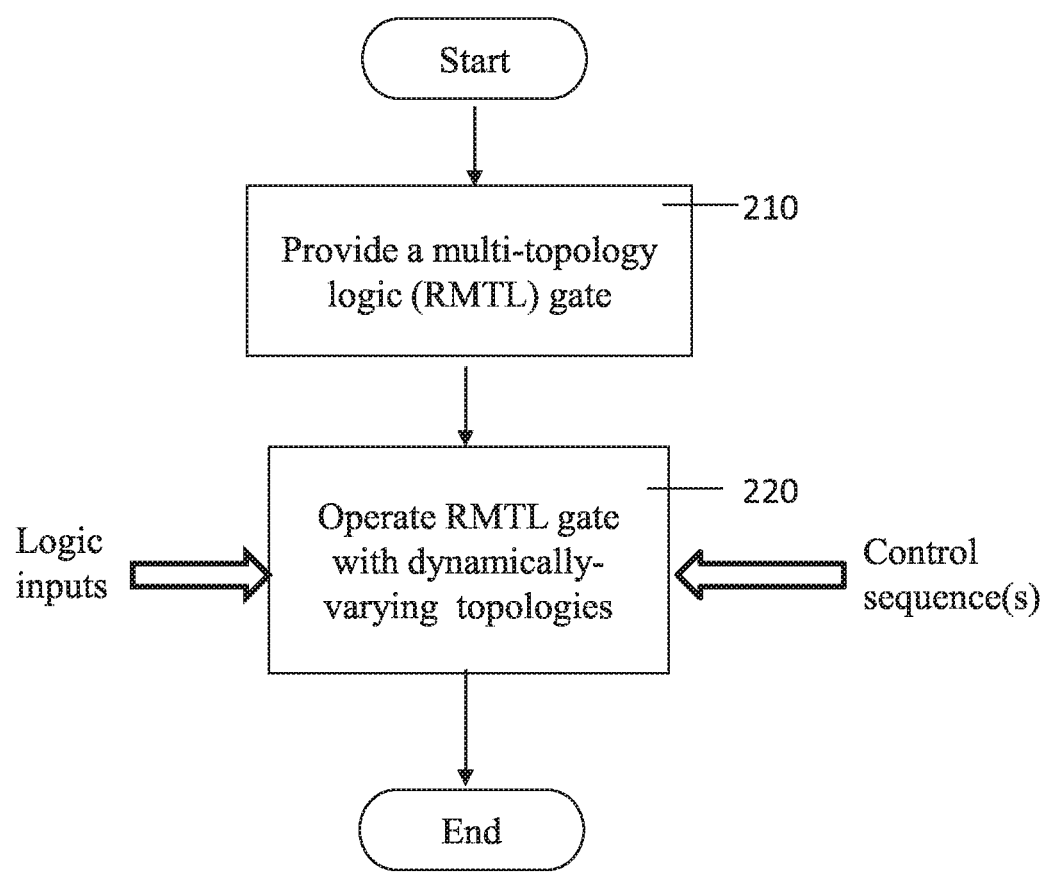
FIG. 2 is a simplified flowchart of a method for logic gate operation, according to some embodiments of the invention.

Reference is now made to FIG. 2, which is a simplified flowchart of a method for logic gate operation, according to embodiments of the invention.

In 210 a multi-topology logic gate capable of operating in multiple topologies is provided. In 220 a sequence of topology control signals is input to the RMTL gate during logic gate operation to dynamically switch the logic gate between the topologies. The topology control signals are selected in a manner that ensures that all logic gate elements (e.g. logic blocks, clock signal inputs, etc.) are operating in accordance with the required topology, and that no conflicts occur amongst the logic gate elements.

Optionally the multi-topology logic gate is an RMTL gate as described herein, and switching between topologies includes switching logic block modes during logic gate operation to obtain the selected topology.

Optionally one or more logic blocks operate in at least two of static, dynamic and on-off modes.

Optionally, the multi-topology logic gate is switched between topologies so as to dynamically vary a power profile of the gate during operation.

The control sequence may maintain a single logic function for the logic gate. Alternately or additionally, the control sequence may change the logic function by switching logic block modes.

Cascading RMTL Gates

Figure 3A:
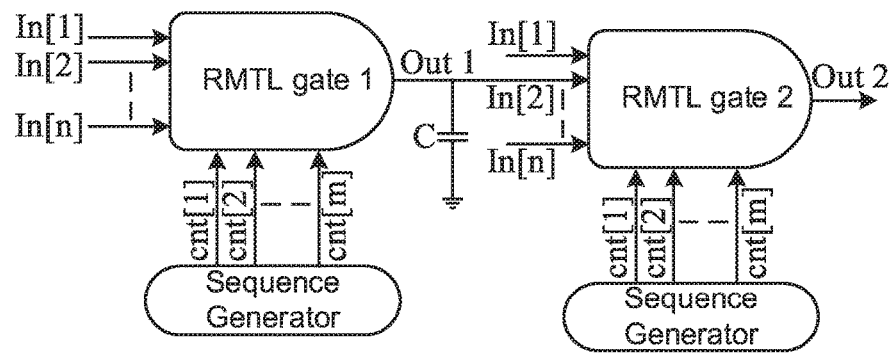
FIG. 3A is a simplified block diagram two cascaded RMTL gates, according to some embodiments of the invention.

Optionally, the RMTL gates are cascaded with no optimization needed. FIG. 3A shows two RMTL gates connected together each having a respective a sequence generator, and where the output of the first gate is connected to an input of RMTL gate 2 (arbitrarily shown here as In[2]).

In contrast to existing optimization approaches, which attempt to optimize the logic on the energy-delay space (e.g., by requiring operation instructions regarding the transistors' sizes), the RMTL gate may achieve a maximum number of random power profiles by selection of appropriate topology control signals. This is a significant advantage over standard designs in which connecting a gate in topology 1 with a gate in topology 2 is not possible due to increased power dissipation/delay or reliability problems. Proper selection of the current topology of each of the RMTL gates may ensure that incompatible gate topologies are not connected.

RMTL Logic Circuits

In some embodiments an RMTL logic circuit is formed from interconnected logic gates, at least one of which is an RMTL logic gate. The RMTL logic circuit may include additional components as needed for circuit operation. These components may operate in single or in multiple topologies and/or be involved in controlling the gate/circuit operating topology, as required by the respective logic circuit. In some embodiments, the RMTL logic circuit includes at least one interconnection element separating between the RMTL logic gates. Changing the topology of one or more of the RMTL logic gates changes the topology of the entire logic circuit.

RMTL Logic Circuit Operation

Figure 3B:
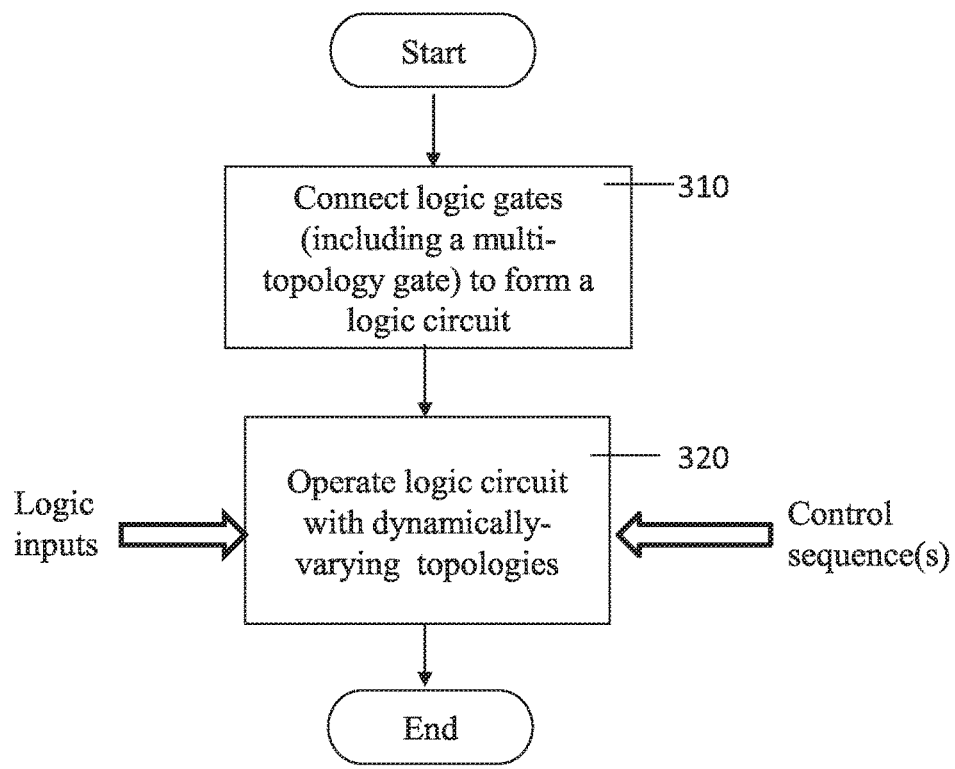
FIG. 3B is a simplified flowchart of a method for logic circuit operation, according to some embodiments of the invention.

Reference is now made to FIG. 3B, which is a simplified flowchart of a method for RMTL logic circuit operation, according to embodiments of the present invention. The logic circuit includes logic inputs, at least one logic output and at least one topology control input for controlling logic circuit topology.

In 310 logic gates, including at least one multi-topology gate, are connected to form a logic circuit which performs a logic function. Each of the multi-topology logic gates may operate in multiple topologies in accordance with the gate's respective control input(s).

In 320 a topology control sequence is input to the control inputs during logic circuit operation. The topology control sequence dynamically switches between logic gate topologies during operation. As described in more detail herein, dynamic switching of logic gate topology may result in improved protection from DPA, DEMA and other types of attacks.

Optionally the one or more of the multi-topology logic gates is an RMTL gate as described herein, and switching between topologies includes switching logic block modes during logic circuit operation in order to obtain the required topology.

The control sequence may include separate control subsequences for respective RMTL logic gates within the logic circuit.

The control sequence input into the logic gate control inputs may be random, semi-random or a specified sequence. The specified sequence may be optimized to provide protection from security attacks, and may be tailored to a specific RMTL circuit and/or gate.

According to some embodiments of the invention, the logic circuit comprises a security key and the control sequence is adapted to disguise the security key from detection during logic circuit operation.

According to some embodiments of the invention, the control sequence maintains a single logic function for the logic circuit, while varying the respective topologies of the logic gates.

According to some embodiments of the invention, the control sequence switches between multiple logic functions for the logic circuit, while varying the respective topologies of the logic gates.

It is expected that during the life of a patent maturing from this application many relevant logic block architectures, logic gate topologies, logic circuit topologies, logic gates, logic circuits, logic gate realizations, logic circuit realizations, materials and manufacturing technologies will be developed and the scope of the terms logic block, logic gate and logic circuit is intended to include all such new technologies a priori.

The terms "comprises", "comprising", "includes", "including", "having" and their conjugates mean "including but not limited to".

The term "consisting of" means "including and limited to".

The term "consisting essentially or means that the composition, method or structure may include additional ingredients, steps and/or parts, but only if" the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof. Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find calculated support in the following examples.

EXAMPLES

Reference is now made to the following examples, which together with the above descriptions illustrate some embodiments of the invention in a non limiting fashion.

RMTL Logic Gate with Five Topologies

A five-topology RMTL gate is described for FIGS. 4-5E. The use of multiple gate topologies is later presented through test circuit simulations. These topologies may be implemented in each RMTL gate, in order to construct a cryptographic module. In the example presented herein we examined the immunity of the RMTL module to DPA attacks.

A. RMTL Methodology Against DPA

Reference is now made to FIG. 4, which is a simplified block diagram of an exemplary RMTL gate with five-topology capability, according to embodiments of the invention. RMTL gate 400 is capable of implementing five separate topologies (denoted herein A, B, C, D, and E). Topology A consists of a static CMOS topology. Topology B and Topology C refer to dynamic logic families with precharge and predischarge configurations, respectively, while Topology D and Topology E refer to dynamic logic families with precharge and predischarge configurations, respectively, including both Pull Up Network (PUN) and Pull Down Network (PDN).

FIGS. 5A-5E illustrate the operation RMTL logic gate 400 in each of the five topologies respectively.

Topology A, shown in FIG. 5A, is a static logic operation. For RMTL static operation, the Pre-charge Clocked Enable signal into transistor 430 and the Pre-discharge Clocked Enable signal into transistor 450 are permanently set to '1' and '0', respectively, and the PDN Enable signal into transistor 440 and the PUN Enable signal into transistor 460 are permanently set to '1' and '0', respectively.

FIGS. 5B and 5C illustrate dynamic logic topologies B and C. FIG. 5B is a PDN dynamic logic gate topology, in which pMOS transistor 430 pre-charges the output to a logical '1' with Pre-charge Clocked Enable signal during the pre-charge phase (the PDN Enable input is set to the same level as the Pre-charge Clocked Enable signal), while PUN network 410 is disconnected, by setting PUN Enable and Pre-discharge Clocked Enable signals to '1' and '0' respectively.

Topology C, illustrated in FIG. 5C, is a PUN dynamic logic gate topology. In Topology C, nMOS transistor 450 pre-discharges the output to a logical '0' with Pre-discharge Clock signal during the pre-charge (the PUN Enable input signal is set to the same level as the Pre-discharge Clock signal), while PDN 420 is disconnected by setting PDN Enable and Pre-charge Clocked Enable signals to '0' and '1', respectively.

FIGS. 5D and 5E illustrate dynamic logic topologies D and E respectively, which utilize both PUN network 410 and PDN network 420 in all phases. In Topologies D and E, Pre-charge Clocked Enable and PDN Enable are the same signal, and, similarly, Pre-discharge Clocked Enable and PUN Enable are the same signal. Topology D is a dynamic precharge topology which includes PUN network 410, and Topology E is a dynamic predischarge topology which includes PDN network 420.

For the dynamic topologies (Topologies B, C, D, E), the Precharge Clocked Enable and Pre-discharge Clocked Enable signals are assigned an asymmetric clock, allowing two distinct phases: Pre-charge (or Pre-discharge) and evaluation. During the Pre-charge (or Predischarge) phase, the output is charged to high/low, dependent on the topology of the RMTL gate. In the consequent evaluation phase, the logic output is evaluated according to the values at the control transistor gate inputs.

The power consumption of each topology is quite different from each other even for the same data flow. It may be seen, that a wise integration between several topologies and small area has been implemented by designing a five-topology RMTL gate, with the addition of only four transistors.

Essentially, static and dynamic logic families differ in their power profile. The consumed power peak in CMOS logic family (static) from the power supply VDD primarily occurs when a low to high transition (0→1) takes place at the gate output.

In contrast, in the dynamic logic family, such as dynamic precharge logic (which may include or may not include a PUN network), different power levels may be consumed at the different stages (and even differently for each logic type). For example, in some dynamic logic having precharge and evaluation phases, the power is mainly consumed from the voltage supply VDD whenever the previous state is '0,' i.e., during bit transitions: 0→0 and 0→1. In a dynamic logic family (which may or may not include a PDN network) with precharge and evaluation phases, the situation may differ as the power from the voltage supply VDD mat mainly consumed (differently for each type) whenever the last state is '1', i.e., during bit transitions: 0→1 and 1→1.

Figure 6:
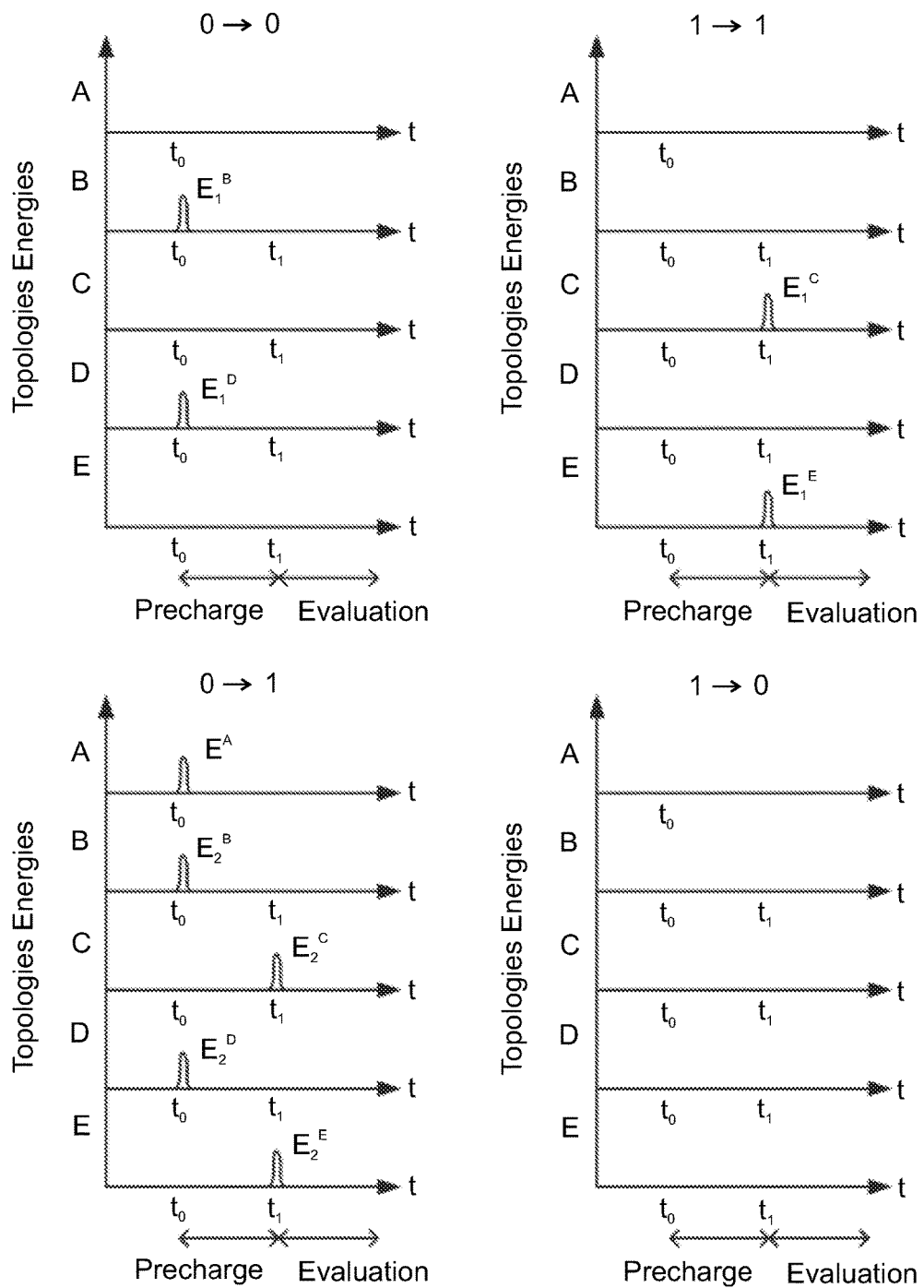
FIG. 6 shows simulation results for consumed energy during transitions of topologies 5A-5E respectively, according to embodiments of the invention.

FIG. 6 illustrates the above described concept by showing energy consumption of topologies A-E for each transition, during both the precharge and evaluation phases. For the dynamic topologies B-E, the precharge phase is between $t_0$ and $t_1$ and the evaluation phase is for $t>t_1$.

It should be noted that the consumed energies are different for each topology (i.e., $E^i \neq E^j$ where $i \neq j$).

Tables I and II below summarize the different consumed energies of each of the five topologies (A-E) for all transitions, for precharge and evaluation phases respectively (assuming arbitrarily that the energy of static Topology A is consumed in the precharge phase).

TABLE I

CONSUMED ENERGY IN PRECHARGE PHASE OF THE FIVE TOPOLOGIES DUE TO VARIOUS LOGIC TRANSITIONS

| Transition | Topology A | Topology B | Topology C | Topology D | Topology E |
|---|---|---|---|---|---|
| 0→0 |  | $E_1^B$ |  | $E_1^D$ |  |
| 1→1 |  |  |  |  |  |
| 0→1 | $E^A$ | $E_2^B$ |  | $E_2^D$ |  |
| 1→0 |  |  |  |  |  |

TABLE II

CONSUMED ENERGY IN EVALUATION PHASE OF THE FIVE TOPOLOGIES DUE TO VARIOUS LOGIC TRANSITIONS

| Transition | Topology A | Topology B | Topology C | Topology D | Topology E |
|---|---|---|---|---|---|
| 0→0 |  |  |  |  |  |
| 1→1 |  |  | $E_1^C$ |  | $E_1^E$ |
| 0→1 |  |  | $E_2^C$ |  | $E_2^E$ |
| 1→0 |  |  |  |  |  |

A. Signal to Noise Ratio Analysis and Modeling

In the context of this randomization approach, the circuit power consumed due to the different topologies act like a random processes, and the main goal is achieving a Signal to Noise Ratio (SNR) as low as possible.

In general, the SNR is described in the following equation:

$$SNR = 10\log\left(\frac{P_{signal}}{P_{noise}}\right);$$

$$P_{consumed} = P_{signal} + P_{noise}$$

where the noise signal comprises of several components, described in next equation:

$$P_{noise} = P_{ele.noise} + P_{quant.} + P_{analog} + P_{uncorr.data}$$

In addition, not only the consumed power is different in each topology for the same processed data. The timing profile for these calculations also differs. The RMTL logic family has the capability to switch randomly between respective topologies at the gate level, in order to achieve randomization of the consumed power signal, thus significantly decreasing the SNR. One of the advantages that the RMTL logic family has compared to other logic families is that it enables lowering the SNR without decreasing the performance and increasing the area substantially.

As stated above, for a DPA attack a very useful and important parameter is the inter-signal SNR ($SNR_{INTER}$). The $SNR_{INTER}$ indicates the difficulty of the recognition of the correct key from the wrong keys.

Basically, the DPA attack comprises two different phases. In the first phase, the power consumption signal is recorded (by measuring the supply current or the voltage drop of an external resistor connected in series to the power supply) for N random but known input sequences (i.e., plaintext, $I_i$, where $i=1, \ldots, N$). The N power traces $tr_i(j)$ include M samples (i.e., $j=1, \ldots, M$). In the second phase, assuming one key k and knowing the algorithm procedure, the outcome is calculated (i.e., ciphertext).

Next, based on the result bits and the power model (e.g. Hamming Weight), the recorded signals from the first phase may be divided into two subsets $S_0$ and $S_1$ (e.g. one bit attack, multi bit attack), using the value of the selection function $D=f(I_i,k)$. Then, one computes the difference of the averages of these subsets (average means many input sequences). The difference in these subsets' averages depends on the correlation between the partitioning into subsets choice (the selection function D) and the measurements contained in the mentioned traces $tr_i$. The DPA result—$\Delta_D(j)$—is actually a discrete time signal where the Y-axis shows the difference in the averages of the two distributions. In case of correlation (the guessed key was correct), at some point in time these distributions will differ, resulting in a nonzero value δ (i.e., a higher spike) in the graph. This time point (j*) is actually the time when this bit is calculated somewhere in the chip, hence resulting in consumed power needed for this calculation. In uncorrelated case, the distributions will not have statistically significant differences, and the points in the graph will converge to 0 as the number of traces increases.

Depending on the attack type, the selection function $D=0,1$. The average power consumption $A_D$ of the subset $S_D$ ($D=0,1$) is given in Eqn. (1):

$$A_D(j) = \frac{1}{N_D} \sum_{i \in S_D} tr_i(j), \quad (1)$$

$$D = 0, 1$$

According to the above explanations, the differential power trace is $\Delta_D(j) = |A_0(j) - A_1(j)|$, thus a spike δ exhibits in time $j=j^*$ is given by:

$$\delta = |A_0(j^*) - A_1(j^*)| \quad (2)$$

Finally, the inter-signal SNR is described in Eqn. (3):

$$SNR_{INTER} = \frac{\delta(D_{correct})}{\max\{\delta(D_{wrong})\}} \quad (3)$$

Obviously, for successful DPA attack, $SNR_{INTER}$ must be greater than unity, for the correct guess of key k. In further to the analysis of the $SNR_{INTER}$ for static logic circuits [19], in which the major parameter is the number of the 0→1 transitions (see Tables I, II), now we analyze the degradation of the $SNR_{INTER}$ of a crypto-core circuit that includes RMTL gates, comparing to the $SNR_{INTER}$ of a CMOS logic implementation.

We define $P_{RMTL}$ as the number of the RMTL gates out of all gates constructing the circuit, which by default are designed in CMOS technology. The 0→1 transition of the RMTL gate with five topologies may have five different power consumptions at each 0→1 transition (third line in Tables I, II), named $E^A$, $E_2^B$, $E_2^C$, $E_2^D$, $E_2^E$ for topologies A, B, C, D, E, respectively, while only power consumption $E^A$ of Topology A complies the static logic $SNR_{INTER}$ model. Let $n_{top}$ be the number of topologies used in the RMTL gate, $n_{top} \in \{1, 2, 3, 4, 5\}$. Therefore, the probability in which an RMTL gate is configured to topologies B-E is then:

$$P_{RMTLgates} = P_{RMTL} \cdot \frac{n_{top} - 1}{n_{top}}, \quad (4)$$

$$n_{top} \in \{2, 3, 4, 5\}$$

Obviously, for general RMTL gate with m topologies, $n_{top} \in \{2, 3, \ldots, m\}$.

As mentioned, there are N power traces $tr_i$, i.e., there are N points (on time line) that the calculation is performed. Let l be the number of the random time points out of N in which the random sequence generator change an RMTL gate to any topology apart from the static one, and let r be the number of the different sequence generators. We are looking for the probability that a time point X (out of N) is generated at least once. Thus, X is a random variable follows the Binomial Distribution with parameters r and p, X~B (r, p), where p is the success probability given in Eqn. (5)0:

$$p = \frac{\binom{N-1}{\ell-1}}{\binom{N}{\ell}} = \frac{\ell}{N} \quad (5)$$

Therefore, the probability that a time point X is generated by random number generator RNG at least once P(X≥1) without referring the contribution of the 0→1 transitions, which may decrease this probability as well) is given in Eqn. (6):

$$P_{RNG} = P(X \geq 1) = 1 - (1-P)^r \quad (6)$$

As a result, if we refer only to the 0→1 transitions, the new spike $\delta_{RMTL}$ of the correct key is then:

$$\delta_{RMTL}(D_{correct}) = (1 - P_{RMTLgates} \cdot P_{RNG}) \cdot \delta(D_{correct}) \quad (7)$$

Similarly, for the wrong key maximum differential power trace δ, if referring the possible contributions of the 0→1 and the 0→0 transitions, the new spike $\delta_{RMTL}$ of the wrong key is given by:

$$\delta_{RMTL}(D_{wrong}) = (1 + P_{RMTLgates} \cdot P_{RNG}) \cdot \delta(D_{wrong}) \quad (8)$$

Eqn. (9) summarizes the $SNR_{INTER}$ degradation:

$$SNR_{INTER}^{RMTL} = \gamma_{eff} \cdot SNR_{INTER}^{static}, \quad (9)$$

$$\gamma_{eff} = \frac{1 - P_{RMTLgates} \cdot P_{RNG}}{1 + P_{RMTLgates} \cdot P_{RNG}}$$

$\gamma_{eff} \in [0,1]$ is the efficiency coefficient of $SNR_{INTER}^{RMTL}$ for circuits that include RMTL gates, comparing to $SNR_{INTER}^{static}$ of static CMOS logic. For CMOS logic case (there are no RMTL gates), $P_{RMTLgates}=0$, thus $\gamma_{eff}=1$, and on the other hand, $\gamma_{eff} \to 0$, when the whole circuit is implemented with RMTL gates with different RNG for each gate (i.e., $P_{RMTLgates} \cdot P_{RNG} \to 1$).

Figure 7:
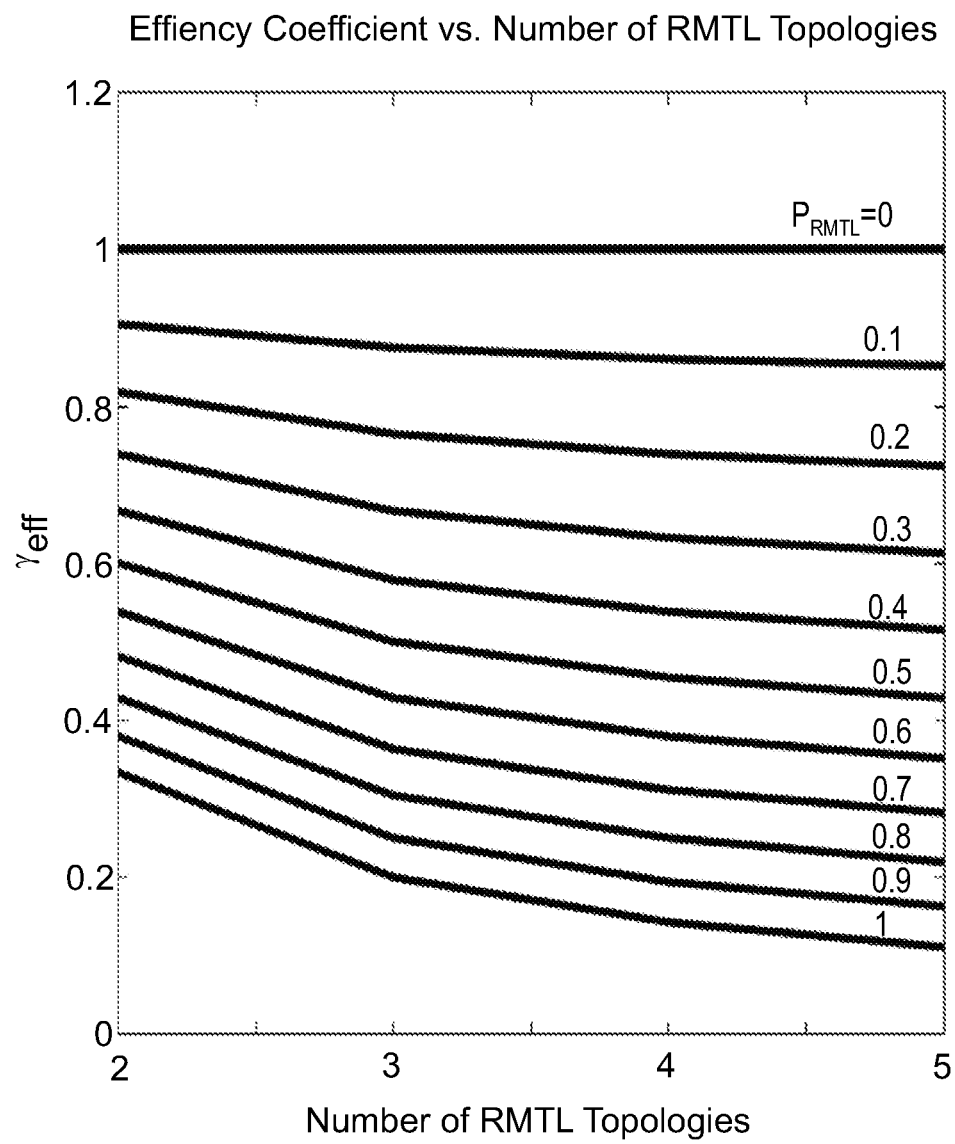
FIG. 7 shows simulation results of the energy coefficient vs. number of topologies, according to exemplary embodiments of the invention.

FIG. 7 shows the behavior of the efficiency coefficient $\gamma_{eff}$ as a function of the number of the RMTL topologies $n_{top}$, for various $P_{RMTL}$ values (0, 0.1, 0.2, . . . , 1), when $P_{RNG}=1$.

It can be seen that for static case (CMOS) when $P_{RMTL}=0$, $\gamma_{eff}=1 \; \forall n_{top} \in \{2, 3, 4, 5\}$ as expected, while $\gamma_{eff}$ decreases with the decrease of $P_{RMTL}$ and the increase of $n_{top}$.

Figure 8A:
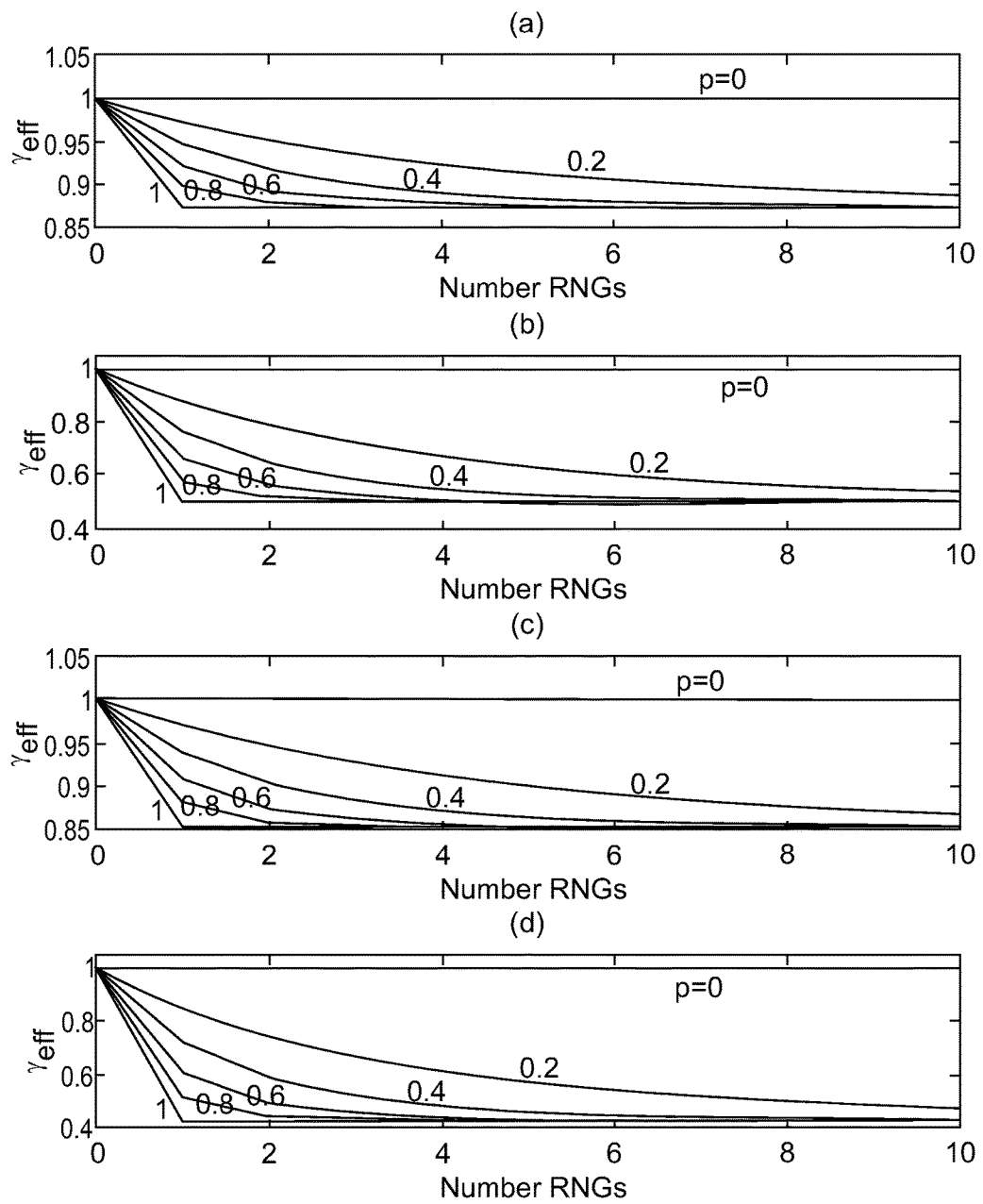
FIG. 8A shows simulation results of the energy coefficient vs. number of sequence random generators, according to exemplary embodiments of the invention.

FIG. 8A shows the behavior of the efficiency coefficient $\gamma_{eff}$ as a function of the number of the RNGs r for three and five topologies $n_{top}=3, 5$, and for two cases of number of RMTL gates $P_{RMTL}=0.1, 0.5$, within various success probability p=0, 0.2, 0.4, . . . , 1.

The static CMOS case is accepted for a zero success probability p=0 (i.e., the RNGs producing no topology change, and the circuit is in static topology) and thus $\gamma_{eff}=1$. We can notice the vast decrease in $\gamma_{eff}$ due to higher number of topologies as well as higher number of RNGs.

As may be seen in the simulation results in next section, the randomization design and implementation (of the RNGs) may cause the intensity of immunity to DPA attacks in several different levels—more strong or less strong, such as randomization of every gate or several groups of gates with the three topologies and different randomized signals, or randomization of only a few gates with only two topologies, respectively.

An intuitive explanation of such immunity to DPA attacks caused by this randomization could be treating the cryptographic circuit as a huge stack of states, or different circuits, that are randomly changed, while every state is one of the selected combinations of the circuits determined by the RNGs, in which each gate of this circuit may be one of the five topologies of the RMTL operation. For example, assuming a circuit composed of fifty gates, and assuming every gate has different RNG, we may treat it as $5^{50}$ different circuits that change randomly.

B. Mutual Information Criterion

In this section, we use information theoretic tools to evaluate the RMTL technology. Specifically, we evaluate the amount of information that leaks from the circuit when it processes data. We examine the mutual information between the inputs to the circuit and the power consumed. These information theoretic tools help us to divide the security problem into two orthogonal problems: evaluation of the actual information that leaks from the circuit, and supposition of how an attacker can (or cannot) model and use it to find the correct key. In this sense, the following information theoretic criterion is stronger than the SNR criterion. Information theory deals with RVs/random vectors and random processes. In our case, the random vectors and processes are as follows.

1) X—the current input to the circuit. X is a uniformly distributed random n-bits binary vector. It is assumed that the current input and the previous input (denoted by $X_p$) are independent, identically distributed random vectors.

2) L(t)—the measured power consumption. L(t) is a random process.

3) $\hat{L}(t)$—a random process that represents the power consumption as simulated by SPICE. The process $\hat{L}(t)$ is a function of the random inputs X, $X_p$ and the random configuration of the RMTL gates embedded in the simulated circuit.

4) η(t)—a random process that represents an additive noise caused by cross talk, process variation, measurement errors, and so on. The noise process is defined as the difference between the SPICE simulated power consumption and the actual measured power $$\eta(t) = L(t) - \hat{L}(t) \quad (10)$$

As shown in [21]-[23], the noise can be represented as a random Gaussian process whose samples are independent Gaussian RVs with zero mean and standard deviation $\sigma_\eta$.

5) R—a random vector over an alphabet of size five. R represents the current configuration of the RMTL gates. The length of R is equal to the number of RMTL gates.

The power consumption is a random process. However, there is a point (or several points) in time when the power consumption reflects the number of transitions inside the S-box. In static logic circuits, there is a single point (denoted as j*), whereas in RMTL logic there are two such points (FIG. 6). We assume that the power consumption is sampled at this point (or two points). Each sample is a continuous RV denoted as L:

$$L = L(X, X_p, \eta, R) = \hat{L}(X, X_p, R) + \eta \quad (11)$$

The entropy of a RV, say X, is defined (in bits) as:

$$H(x) = -\Sigma_x p(x) \log_2 p(x) = -E(\log_2 p(X)) \quad (12)$$

where p(x)=p(X=x) is the probability that an RV X will take the value x, and E(f(X)) stands for the expected value of f over the probability distribution of X. Similarly, the conditional entropy of X given L is defined as:

$$H(X \mid L) = E\left(\log_2 \frac{p(L)}{p(X, L)}\right) \quad (13)$$

Figure 8B:
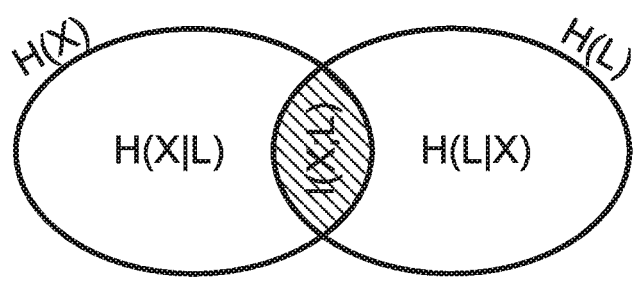
FIG. 8B is a simplified illustration of the Mutual Information between the X and L.

The mutual information between the X and L represents the amount of information that L provides about X (see FIG. 8B). The mutual information is denoted by I(X; L):

$$I(X;L) = H(X) - H(X|L) = H(L) - H(L|X). \quad (14)$$

If L tells everything about X, then I(X; L)=H(X), and if L tells nothing about X, then I (X; L)=0. The goal is to minimize I(X; L); that is, to minimize the leakage of information from the circuit. Similarly, the mutual information between the input X and the SPICE simulated $\hat{L}$ is denoted:

$$I(X;\hat{L}) = H(X) - H(x|\hat{L}). \quad (15)$$

The mutual information between the input X and both L and L is described as:

$$I(X;L,\hat{L}) = I(X;L) + I(X;\hat{L}|L) = I(X;\hat{L}) + I(X;L|\hat{L}). \quad (16)$$

When $\hat{L}$ is given, L does not provide any additional information about the input X, therefore, I(X; L|$\hat{L}$)=0. This leads to an upper bound on the mutual information between the input variable and the measured power consumption, as stated:

$$I(X;L) \le I(X;\hat{L}). \quad (16)$$

Figure 8C:
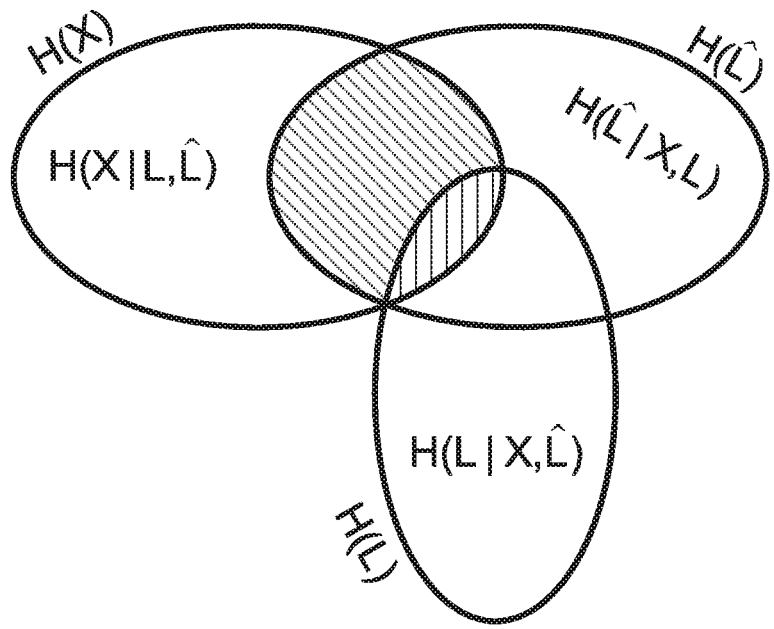
FIG. 8C is a simplified illustration of the relations between H(X), H(L), and H($\hat{L}$)

FIG. 8C illustrates Eqn. 16. The mutual information I(X; L) that shows an actual leak of information is vertically lined, and mutual information I(X; $\hat{L}$) that is calculated as an upper bound is the diagonally lined area.

In next section, we calculate the value of I(X; $\hat{L}$) for standard CMOS and RMTL technologies. Satisfactory results obtained for I(X; $\hat{L}$) will necessarily impact to the same extent on I(X; L). In other words, the mutual information obtained by simulated power consumption with no added noise will certainly be improved when noise is considered.

C. Simulation Results

Figure 8D:
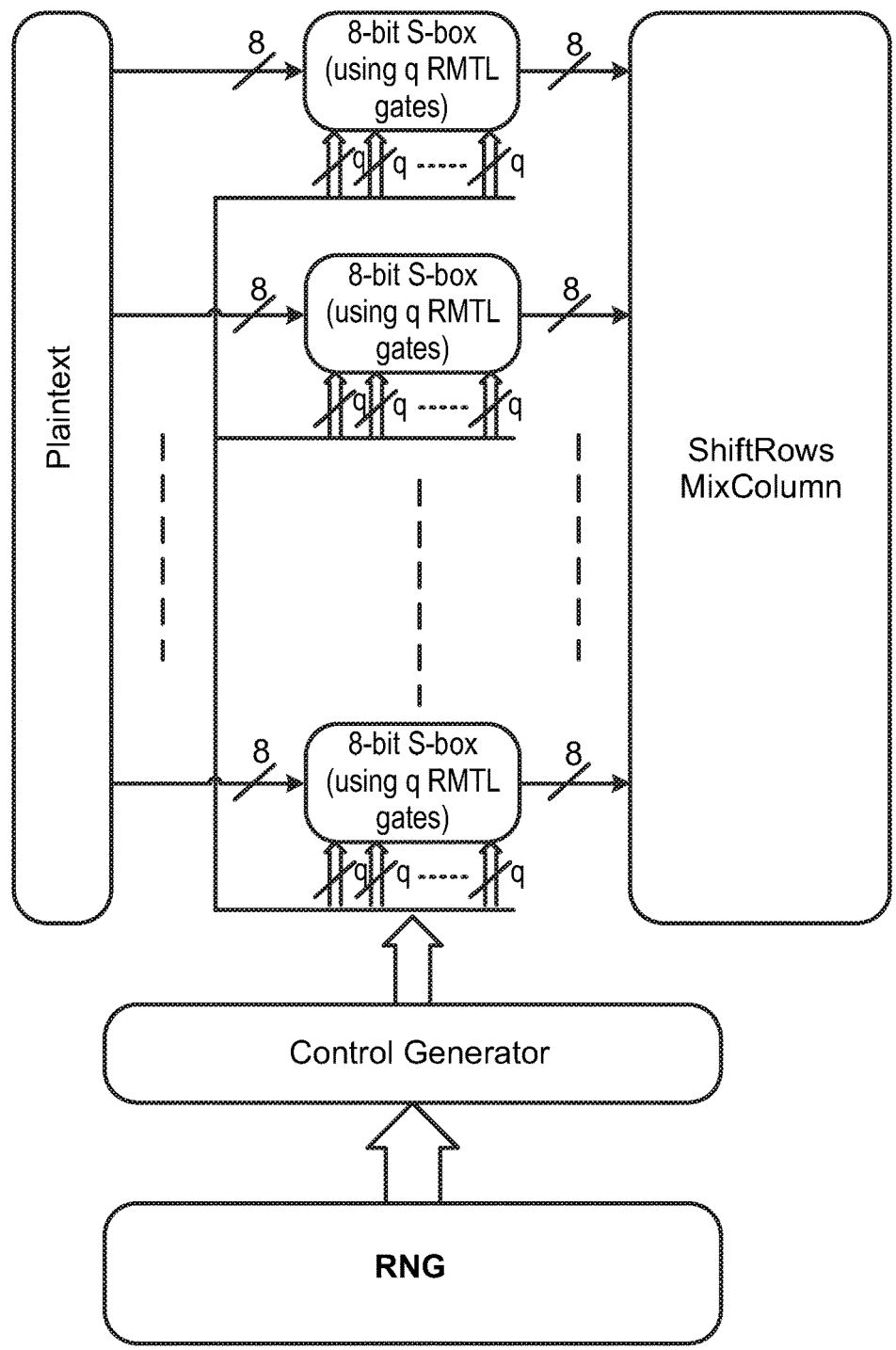
FIG. 8D is a simplified block diagram of a system including 8-bit S-box modules with RMTL gates, according to embodiments of the invention.

Reference is now made to FIG. 8D, which is a simplified block diagram of an exemplary embodiment of a cryptographic system which include RMTL gates, giving the system the ability to operate in multiple topologies. Use of RMTL logic gates is not restricted to any particular hardware realization of cryptographic architecture (e.g., RSA, AES, DES etc). RMTL circuits may be useful for implementing any cryptographic architecture, including, but not limited to, symmetric design, asymmetric design and automatic design (for example implemented by CAD tools, etc.).

DPA Test Setup

A real cryptographic system [such as an advanced encryption standard (AES) implementation], has various modules, each of which has a different role in the cryptographic algorithm (e.g., S-box, shift rows, and mix columns). Consider the system shown in FIG. 8D. Several 8-bit S-box modules are used (the exact number depends on the encryption algorithm type), and each includes q RMTL gates.

The control buses of the S-box modules ($cnt_1$, $cnt_2$, ..., $cnt_q$) are fed from a control generator. The control buses of each S-box can be the same. The difference, then, should be reflected in the different locations of the RMTL gates that are connected in each S-box module. An RNG module, which exists at any cryptographic chip, is used for a random sequence generation. The control generator translates the output sequence of the RNG, and produces the appropriate control signals for each bus.

In general, the S-box (or SubBytes) block in the AES algorithm is an 8-bit block [27], which is the only nonlinear operation in the algorithm, and thus the most vulnerable block to DPA attack. Since we are dealing with simulations, we focus on a smaller system. To evaluate the proposed RMTL methodology, a 4-bit S-box module was chosen as a benchmark. Although this block is smaller, which enables reduced simulation time, it is still an efficient indicator. The test setup used to assess DPA attacks is described below.

The 4-bit S-box module was implemented in 40-nm standard CMOS technology with 1.1V VDD, using a Cadence Virtuoso environment, and its immunity to DPA attacks was examined. It is composed of a Galois field (GF) inverse operation (cyclic inverse) and a linear transformation. Hence, its calculations are in a $GF(2^4)$ field. The module consists of 72 gates, including two and three inputs of NAND and NOR. For the RMTL examination, six RMTL gates were implemented arbitrarily in the S-box, and all the rest of the gates were implemented in standard CMOS gates.

Figure 8E:
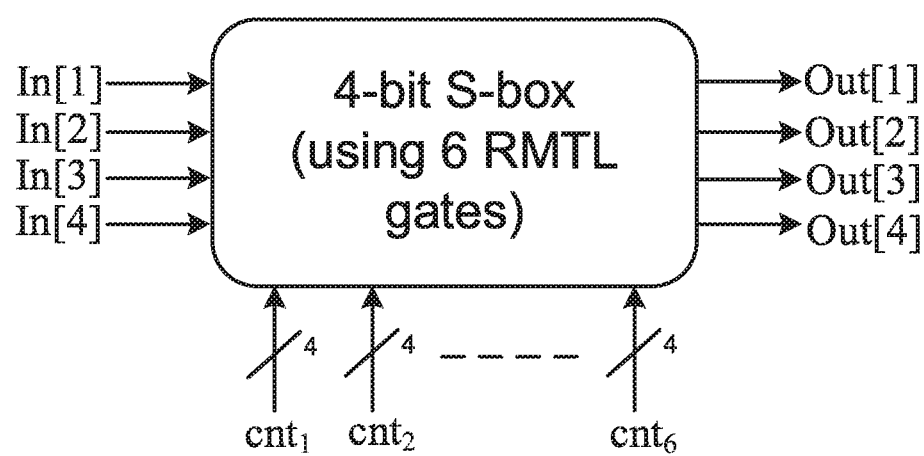
FIG. 8E is a simplified block diagram of a 4-bit S-box with RMTL gates, according to embodiments of the invention.
Figure 8F:
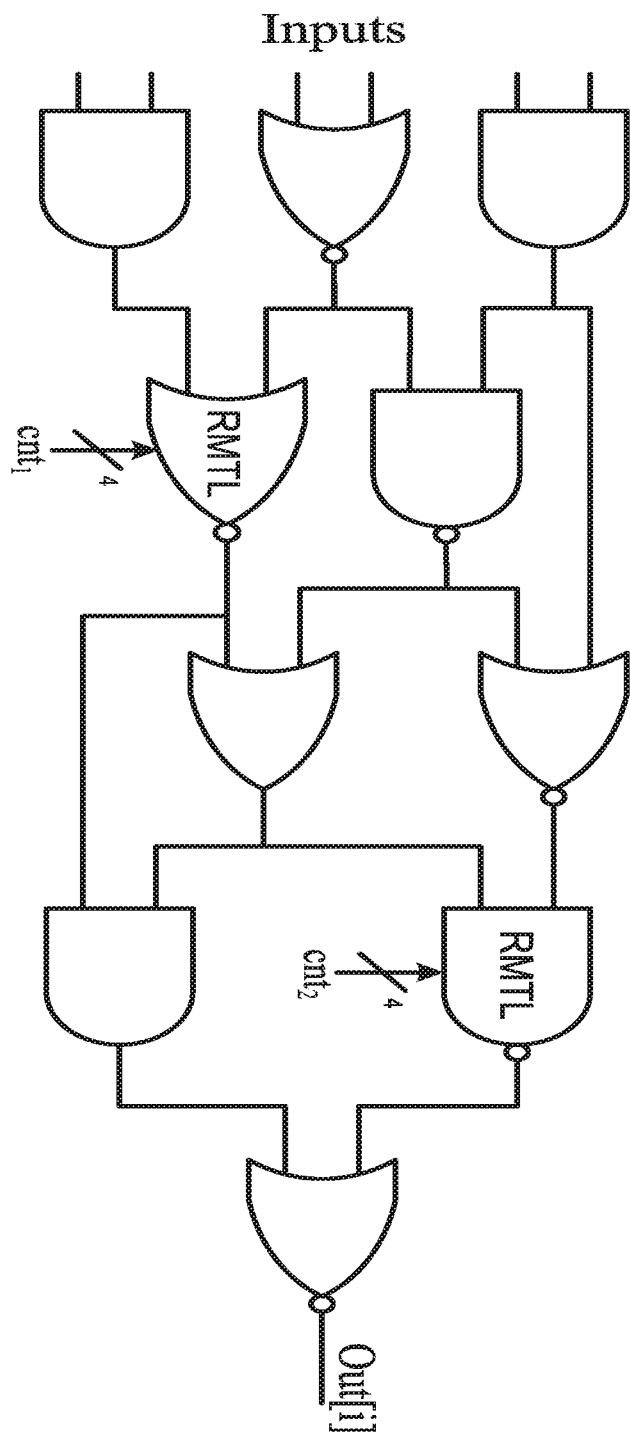
FIG. 8F shows a typical path inside an S-box that includes RMTL and standard CMOS gates, according to embodiments of the invention.

FIG. 8E shows the 4-bit S-box implementation including the RMTL gates. It consists of four inputs, four outputs, and six different control buses. Each control bus $cnt_i$ is connected to a different RMTL gate, whereas the rest of the gates are implemented with standard CMOS. The $cnt_i$ bus consists of four control signals that determine the selected RMTL topology, as shown in the figure. A typical path inside the S-box that consists of RMTL and standard CMOS gates is shown in FIG. 8F. Note that the selection of gates implemented in the RMTL logic is arbitrary.

Figure 9:
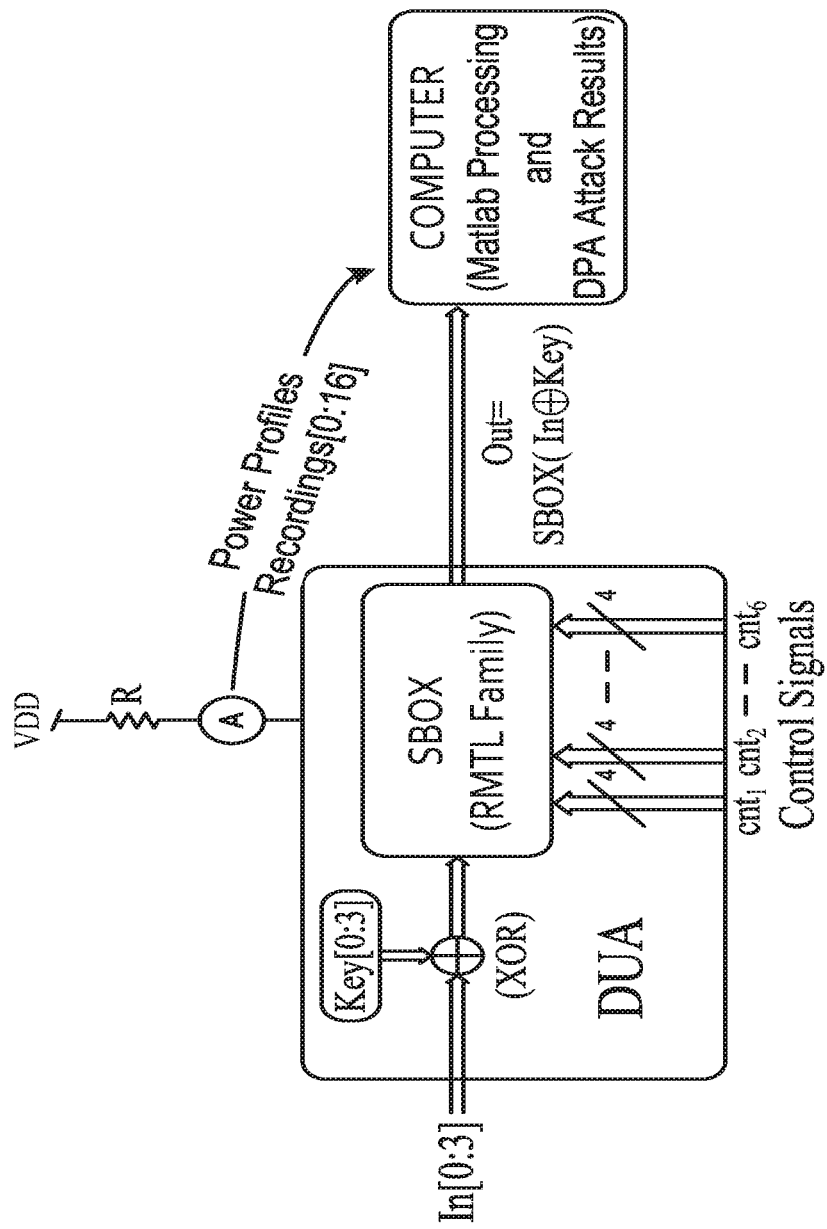
FIG. 9 is a simplified diagram of DPA Test Circuit, according to some embodiments of the invention.

FIG. 9 shows the test setup which includes the device under attack (DUA), the current measurement setup, and the power profile recordings data process (using MATLAB).

The 4-bit input signal is first XORed with a 4-bit secret key, and then the result propagates to the 4-bit SBOX block. The SBOX implementation uses the RMTL family, whereas their control signals ($cnt_1$, $cnt_2$, ..., $cnt_6$) are governed by a control generator.

SNR Measurements

Figure 10:
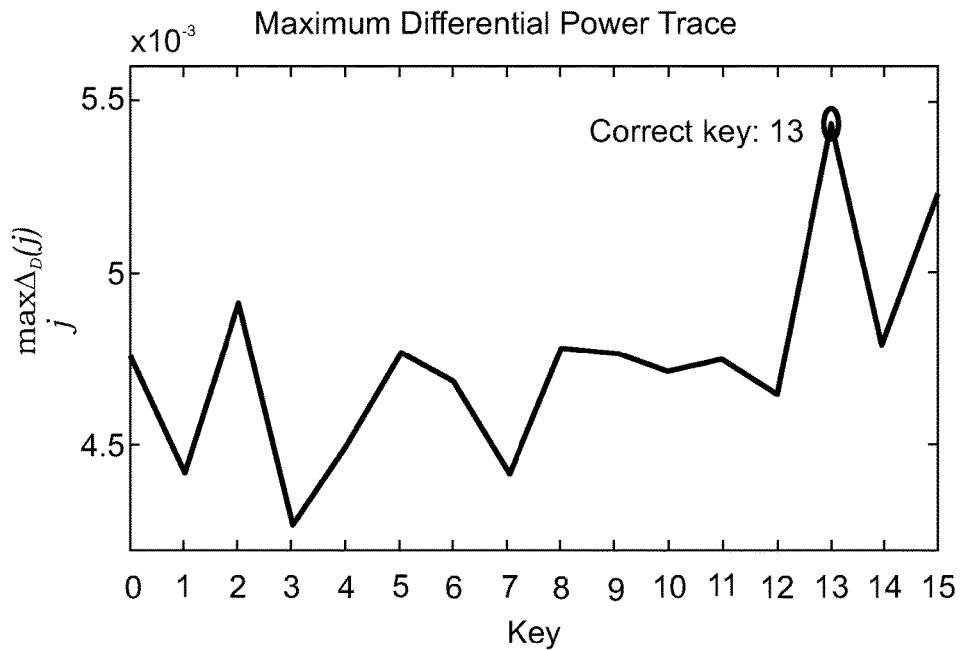
FIG. 10 illustrates a successful DPA attack upon an exemplary test circuit implemented using CMOS technology, according to some embodiments of the invention.

1) CMOS Logic:

The first test circuit was realized using the standard CMOS family (the SBOX is implemented using CMOS logic). The circuit inputs—In[0:3] were fed by 200 random but known inputs, and the current graphs were recorded, for evaluating the data process of the DPA attack, based on the intersignal SNR metric, as explained previously. A multibit DPA attack was implemented, such that the selection function $f(I_i, k)$ was defined as the product between the HW and Hamming distance (HD) of the S-box outputs, as shown in Eqn. (17). The two subsets $S_0$ and $S_1$ may therefore be derived immediately, as well as the differential power trace $\Delta_D(j)$. The 200 random inputs are sufficient in our case since we examined a very small module such that there was no environmental noise, and the simulations do not contain noise. Obviously, the attack succeeded to reveal the secret key (arbitrary determined as 1101), even with the existence of noise, as no countermeasures were adopted (FIG. 10).

$$f(I_i, k) = \begin{cases} 0, & HW_i \cdot HD_i = 0 \\ 1, & HW_i \cdot HD_i > 0 \end{cases} \quad (17)$$

Figure 11:
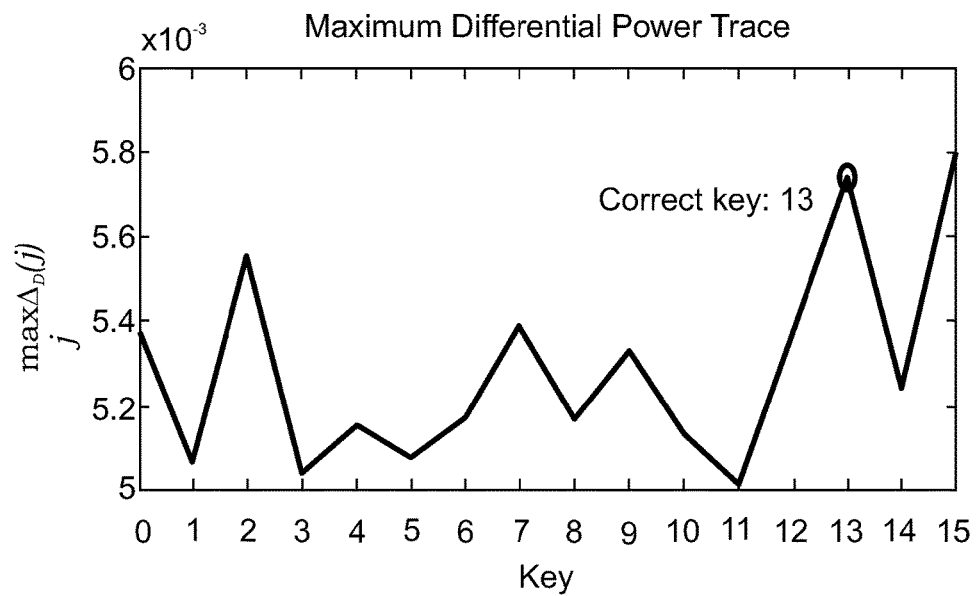
FIG. 11 illustrates an unsuccessful DPA attack upon an exemplary test circuit implemented using two-topology RMTL logic, according to some embodiments of the invention.
Figure 12:
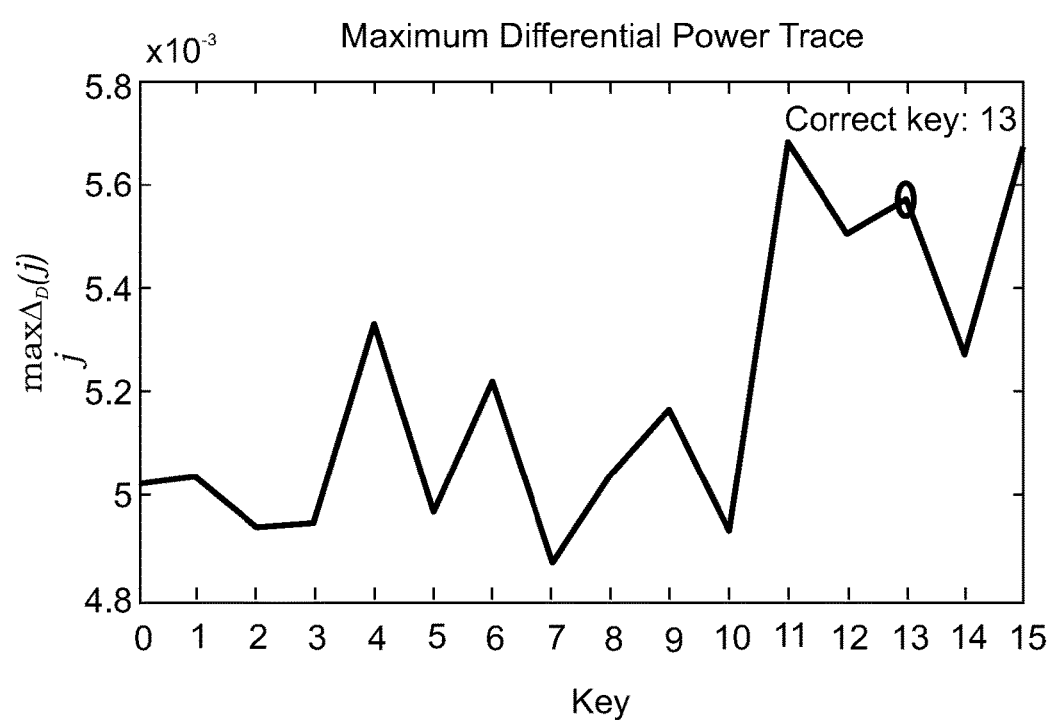
FIG. 12 illustrates an unsuccessful DPA attack upon an exemplary test circuit implemented using three-topology RMTL logic, according to some embodiments of the invention.
Figure 13:
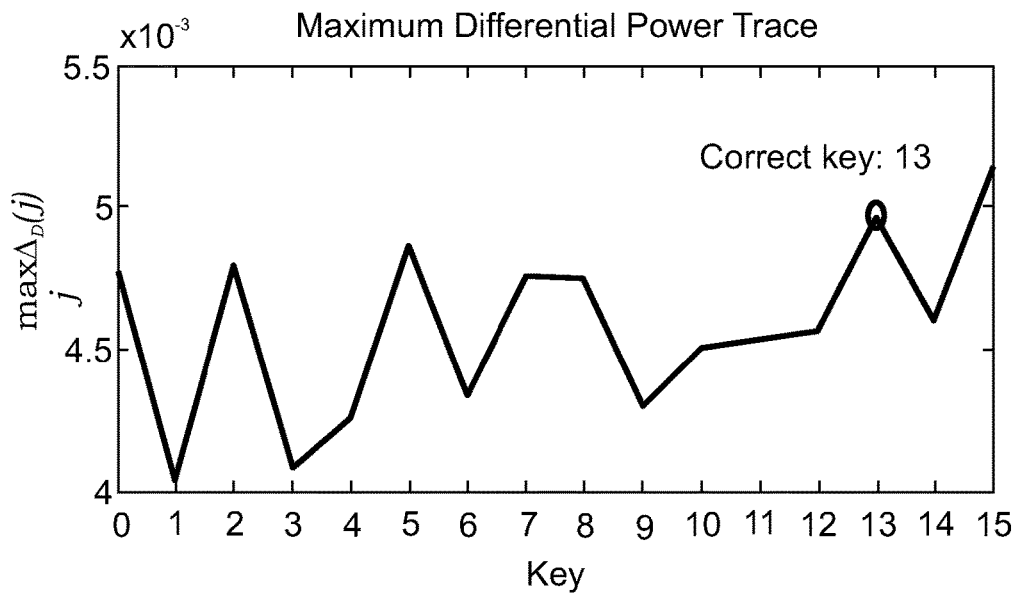
FIG. 13 illustrates an unsuccessful DPA attack upon an exemplary test circuit implemented using four-topology RMTL logic, according to some embodiments of the invention.
Figure 14:
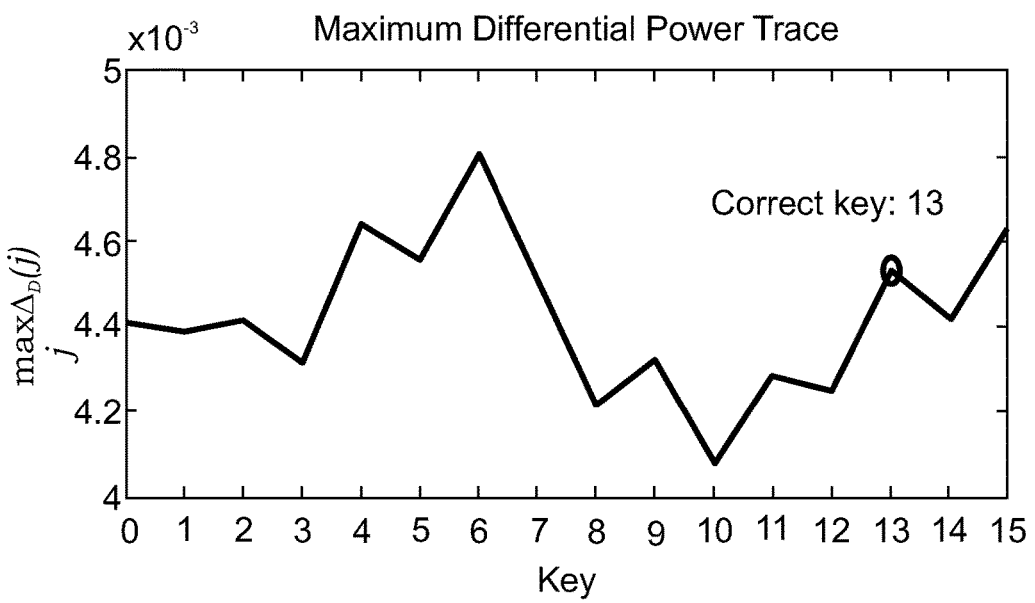
FIG. 14 illustrates an unsuccessful DPA attack upon an exemplary test circuit implemented using five-topology RMTL logic, according to some embodiments of the invention.

2) Rmtl Family:

The first phenomenon that could occur when using RMTL is the deviation of the Hamming Weight (HW) model from the actual consumed power during the calculation, stemming from the use of alternating between static and dynamic modes of operation. Using the HW model (as a common model used for DPA attacks) which does not estimate the consumed power well (as may be studied from Tables I, II) might decrease the peak in $\delta$ for the right key, as well as increasing 'ghost peaks' in $\Delta(j)$ for wrong key guesses, as the division into the two subsets is no longer correlated to the actual power consumption. The second phenomenon needed to be treated is the time shift of the attacked bit calculation. By the nature of the RMTL family, the calculation time for each gate is different when comparing static and dynamic modes of operation. Consequently, the exact time the calculation of the attacked bit occurs (i.e., j*) is a Random Variable (RV). This RV is actually a sum of RVs which are the logic gate delays (determined by the operation modes in each cycle) along the calculation path of the attacked bit. Being the calculation time an RV leads to a smeared peak, and hence decreases both SNR.

a) RMTL—Two Topologies:

Using the same test-circuit as described for FIG. 9, an initial version of the RMTL family was evaluated. The SBOX was implemented using RMTL gates. At the first stage, the RMTL gates were constructed, where 90% of them were operated in a static topology—Topology A and the rest 10% of them combined two topologies: a static topology—Topology A with dynamic topology—Topology D) i.e., two topologies, a static and dynamic precharge including PUN). Like in previous test, for the DPA attack process, the current graphs were recorded for the different inputs—In[0:3] fed by 200 random but known inputs and (the same inputs as in previous test). In this experiment, several different random number generators (RNG) were used for the precharge and predischarge topologies, governing only the relevant gates of the test-circuit, while all the other gates were set to a static topology. As will be discussed later, the use of the RNG's will be examined. As shown in the maximum differential power trace (in terms of the key guess) graph in FIG. 11, the DPA attack was not successful, as the real key (1101) shows lower peak than another false key, which is in this case (1111).

b) RMTL—Three Topologies:

Further to the previous result, with the same inputs—In [0:3], in the next step we examined the maximum differential power trace results when the same 10% of the SBOX gates were implemented by three topologies—a static topology—Topology A, and dynamic topologies Topology D and Topology E (i.e., three topologies, a static, and two dynamic precharge and predischarge including PUN and PDH, respectively), while the rest 90% of the SBOX gates were remained in a static topology—Topology A. We can see in the maximum differential power trace graph, shown in FIG. 12, that the DPA attack was not successful in this case as well, as the real key (1101) shows lower peak than another false key, which is in this case (1111). In this case we can even notice a lower SNR than in previous case, which could indicate a higher immunity to DPA attacks.

c) RMTL—Four Topologies:

In the next step we examined the maximum differential power trace results when the same conditions where 10% of the SBOX gates were operated using four topologies. A static topology—Topology A, and dynamic topologies—Topology D, Topology E, and Topology B (i.e. four topologies, a static, two dynamic precharge and predischarge including PUN and PDH, respectively, and one dynamic precharge), while the rest 90% of the SBOX gates were remained in static topology—Topology A. It can be noticed in FIG. 13 that the DPA attack was not successful in this case as well, as the real key (1101) shows lower peak than another false key, which is in this case (1111).

d) RMTL—Five Topologies:

In this case all five topologies are utilized. We examined the maximum differential power trace results when the same 10% of the SBOX gates were operated in five topologies. A static topology Topology A, and all dynamic topologies Topology B, Topology C, Topology D, and Topology E (i.e., five topologies, a static, two dynamic precharge and predischarge including PUN and PDH, respectively, and two dynamic precharge and predischarge, respectively), while the rest 90% of the SBOX gates were remained in static topology—Topology A. We can see in the maximum differential power trace graph, shown in FIG. 14, that the DPA attack was not successful in this case as well, as the real key (1101) shows lower peak than another false key, which is in this case (0110).

Power Profiles Comparison

Figure 15:
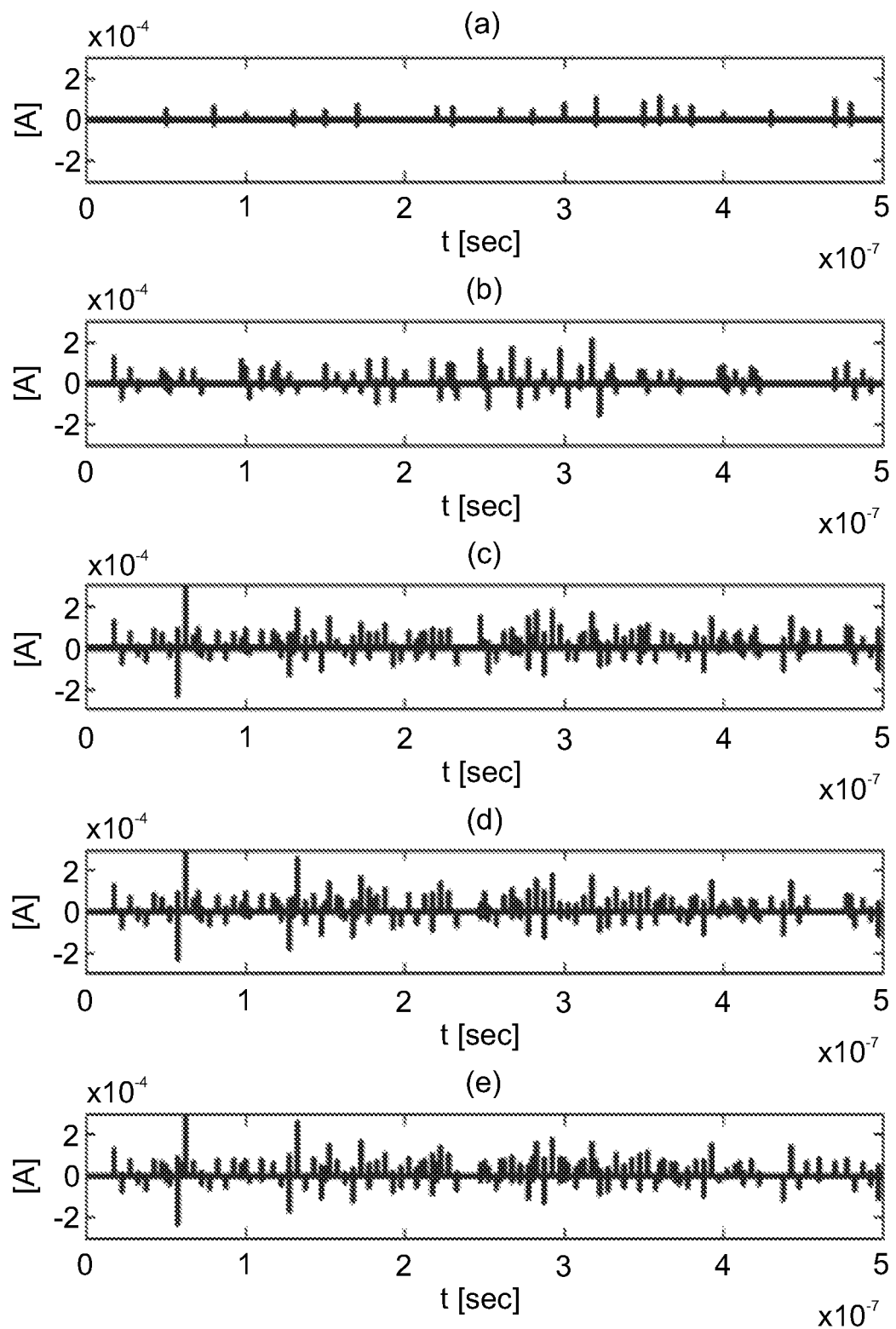
FIG. 15 illustrates the supply current during simulated SBOX operation with: CMOS logic and two-topology through five-topology RMTL, according to some embodiments of the invention.

The power profiles (supply current) of the three cases for the same 200 random inputs—In[0:3] are given in FIG. 15.

As expected and described in previous sections, it may be seen that the power profile of the CMOS logic is relatively "quiet" comparing to the "noisy" ones of the RMTL logic. The CMOS logic current graph accommodates the least amount of current spikes according to the input transitions, while much more current spikes appear in the power profiles of the RMTL logic. In addition, we may notice that the amount of the current spikes increases as the number of the RMTL topologies rises from two to five topologies. As a result, as "noisier" as the power profile gets (e.g., a larger RMTL topologies), the SNR decreases, which may intuitively explain the obtained maximum differential power trace results: by the RNGs control of the several RMTL gates, they change randomly between their topologies, which consequently causes an unpredictable behavior of the power profile, comparing to the expected power profile of the CMOS logic.

Estimating the Mutual Information

We constructed a profiled security evaluation to calculate the mutual information between the inputs and the leakage of the 4-bit S-box. We used the same test bench to implement a template attack estimation tool introduced in [28] on the S-box using 10% of the gates with RMTL. Template attacks are considered a useful way to estimate the worst-case scenario in information theoretic analysis [24][24]. The mutual information, introduced in [22] and [29], tells us how accurately the adversary's leakage model can predict the actual leakage distribution of the device.

In the first step, we produced 16×1000 power traces using SPICE. For the 4-bit S-box implemented with CMOS gates, these traces represent the 16 transitions from $X_p=0$ to all the 16 possible values of X. In terms of the RMTL, they correspond to both the precharge and evaluation phases of the S-box computation, for the same 16 inputs. Then, we computed the mutual information for the CMOS and RMTL technologies. The computed entropies and mutual information were based on 1000 measurements for each input transition.

The maximal mutual information for this setup is the entropy of X; that is, 4 bits of information. The mutual information between the input X and the simulated (noise-free) power consumption $\hat{L}$ of both the CMOS and RMTL 4-bit S-box modules was computed using:

$$I(X; \hat{L}) = H(\hat{L}) - H(\hat{L}|X) \qquad (18)$$

$$H(\hat{L}|X) = -\sum_{x \in X} Pr[x] \sum_{l \in \hat{L}} Pr[l|x] \log_2 Pr[x|l]$$

Table III presents the mutual information $I(X; \hat{L})$ and $I(HW; \hat{L})$ results for both the CMOS and RMTL S-box modules.

TABLE III

MEASURED MUTUAL INFORMATION

| | | | RMTL | |
| --- | --- | --- | --- | --- |
| | Maximal I | CMOS | @ precharge | @ evaluation |
| $I(X; \hat{L})$ | 4 | 2.6 | 0.0310 | 0.1215 |
| $I(HW; \hat{L})$ | 2.03 | 1.18 | 0.0047 | 0.0404 |

As can be seen from Table III, the CMOS technology leaks more than half of the bits of X and thus is vulnerable to DPA attacks. In contrast, when using RMTL gates, the leakage is significantly reduced and approaches zero. Recall that these results form an upper bound on the actual leakage, as described in Eqn. (16). Obviously, in practice, the noise adds uncertainty and thus decreases the leakage even more. Consequently, using the RMTL gates in a cryptographic device leads to a much lower leakage of information than CMOS technology, and may increase immunity to DPA attacks.

Maximum Differential Power Trace Comparison

Figure 16:
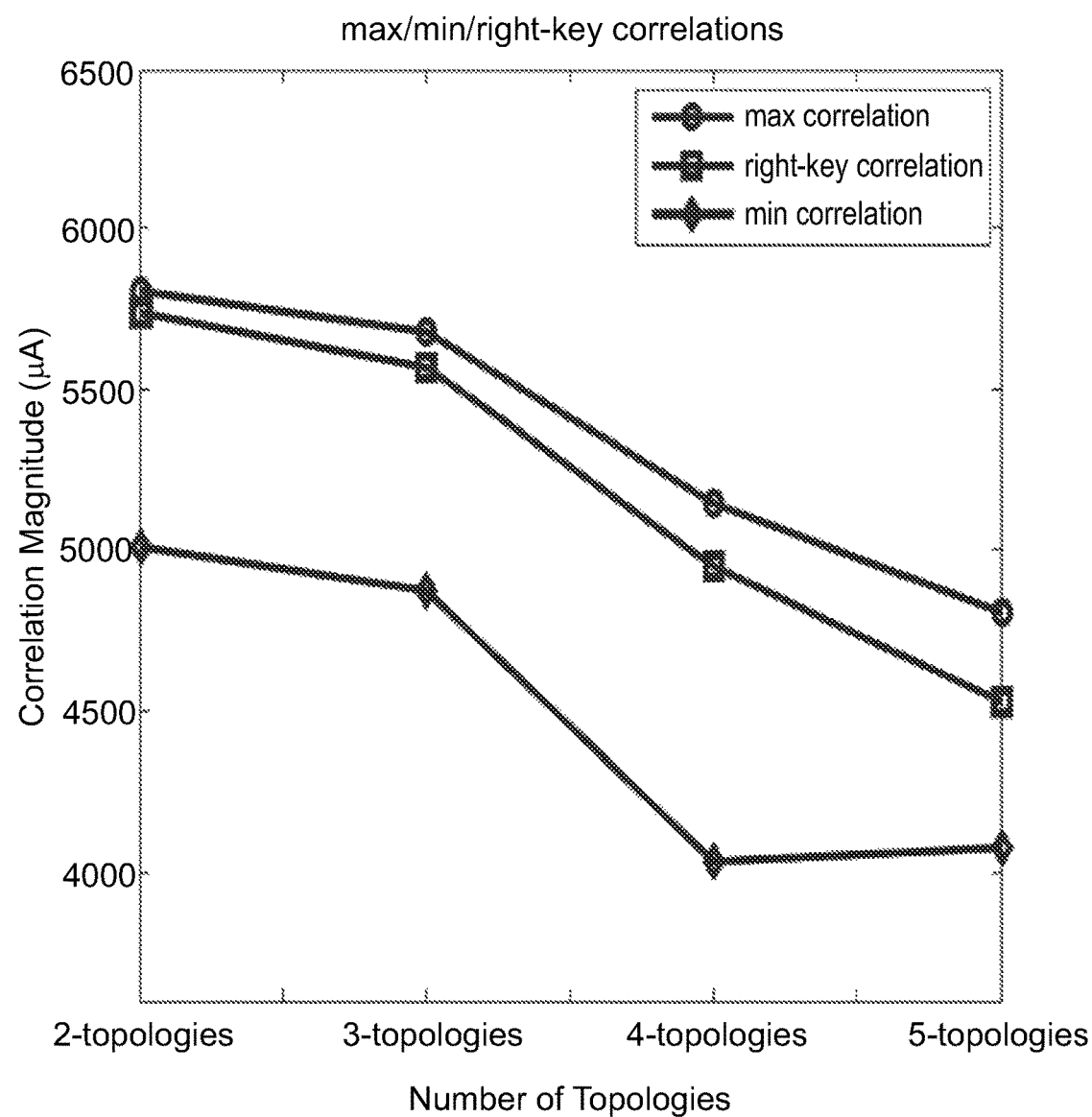
FIG. 16 is a graph comparing simulation results of the maximum, minimum, and the correct key maximum differential power trace magnitudes for multiple RMTL topologies.

An additional parameter that may point to the effectiveness of the RMTL methodology is the diminishing trend of the maximum differential power trace magnitude with relation to the rising number of the RMTL topologies. FIG. 16 shows an example of the maximum, minimum, and the correct key (1101) maximum differential power trace magnitudes for two, three, four, and five RMTL topologies. We can notice that the larger the number of the RMTL topologies, the small the maximum differential power trace magnitude. This tendency may lead to higher immunity to DPA attacks.

$SNR_{INTER}$ Model

Here we compare the theoretical $SNR_{INTER}$ calculated results and the $SNR_{INTER}$ achieved in the simulation results. As described previously, in our test there are six different RMTL gates out of ~50 gates, and thus we have six different RNGs that change the RMTL gates topology from Topology A for about 20÷35 times out of the 200 time points. Using equations 4-9 and the simulation results, the calculated and the measured $SNR_{INTER}$ versus the number of the topologies of the RMTL gates are described in Table IV.

TABLE IV

CALCULATED AND MEASURED $SNR_{INTER}$ vs. NUMBER OF RMTL TOPOLOGIES

| | Topology | | | | |
| --- | --- | --- | --- | --- | --- |
| | A (CMOS) | A, D | A, D, E | A, D, E, B | A, D, E, B, C |
| $SNR_{INTER}^{measured}$ | 1.04 | 0.9892 | 0.9813 | 0.9625 | 0.9428 |
| $SNR_{INTER}^{calculated}$ | | 0.996 | 0.9718 | 0.954 | 0.9399 |

Figure 17:
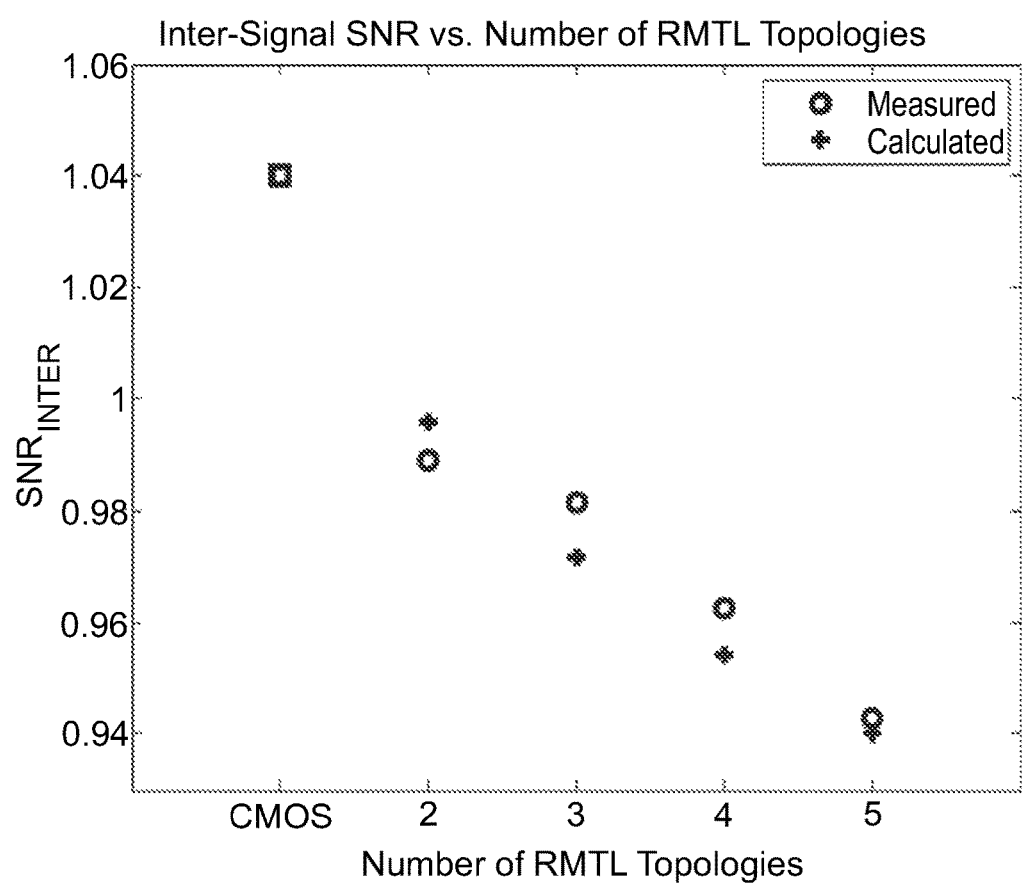
FIG. 17 is a graph showing simulation results for the $SNR_{INTER}$ degradation for several RMTL topologies as compared to static topology, according to exemplary embodiments of the invention.

FIG. 17 shows graphically the $SNR_{INTER}$ degradation when using number of RMTL topologies, comparing to static topology, as well as the good approximation of the calculated $SNR_{INTER}$ by above model to the measured $SNR_{INTER}$ by simulation. It can be seen that the $SNR_{INTER}$ is smaller than unity for a case of randomized RMTL gates, thus much less vulnerable to DPA attacks, while for example, the $SNR_{INTER}$ for the static mode operation is greater than unity, which its immunity to DPA attacks is very low.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A multi-topology logic gate for performing a specified logic function, said logic gate comprising logic inputs and a logic output, comprising:
   a logic output connection configured to output a logic output signal;
   a plurality of logic input connections configured to input logic signals;
   at least two logic blocks associated with said logic input connections and said logic output connection, each of said blocks respectively comprising a plurality of logic inputs connectable to said logic input connections and a logic output connected to said logic output connection, wherein at least one of said logic blocks is configured to operate in a plurality of modes in accordance with a respective mode control signal; and
   a topology selector associated with said at least two logic blocks, configured to apply mode control signals to said logic blocks so as to operate said logic gate in a plurality of topologies.

2. A multi-topology logic gate according to claim 1, wherein said logic blocks comprise respective transistor networks.

3. A multi-topology logic gate according to claim 1, wherein said logic blocks implement a same logic function in different respective topologies.

4. A multi-topology logic gate according to claim 1, wherein logic blocks having a plurality of modes of operation are respectively configured to operate in at least two of static, dynamic and on-off modes, in accordance with said mode control signals.

5. A multi-topology logic gate according to claim 1, wherein at least two of said logic blocks are configured to operate in a plurality of modes in accordance with a respective mode control signal.

6. A multi-topology logic gate according to claim 1, further comprising a logic block with a single mode of operation.

7. A multi-topology logic gate according to claim 1, wherein at least one of said mode control signals is a constant voltage.

8. A multi-topology logic gate according to claim 1, wherein at least one of said mode control signals is a clock signal.

9. A multi-topology logic gate according to claim 1, wherein said topology selector is configured to connect a pre-charge clock signal to said logic output connection during pull-down dynamic logic operation.

10. A multi-topology logic gate according to claim 1, wherein said topology selector is configured to connect a pre-discharge clock signal to said logic output connection during pull-up dynamic logic operation.

11. A multi-topology logic gate according to claim 1, wherein said topology selector is configured to switch said logic gate between said topologies randomly.

12. A multi-topology logic gate according to claim 1, wherein said topology selector is configured to switch said logic gate between said topologies in accordance with a specified sequence.

13. A multi-topology logic gate according to claim 1, wherein said topology selector comprises topology control inputs and is configured to switch said logic gate between said topologies in accordance with external signals input to said topology control inputs.

14. A multi-topology logic gate according to claim 1, wherein said topology selector is configured to direct logic input signals to respective logic inputs of selected ones of said logic blocks, in accordance with a current topology.

15. A multi-topology logic gate according to claim 1, wherein logic inputs of at least one of said logic blocks are fixedly connected to said logic input connections.

* * * * *